(12) United States Patent
Hsieh et al.

(10) Patent No.: US 8,254,728 B2
(45) Date of Patent: *Aug. 28, 2012

(54) METHOD AND APPARATUS FOR TWO DIMENSIONAL IMAGE PROCESSING

(75) Inventors: Ming Hsieh, South Pasadena, CA (US); Huansheng Xue, San Gabriel, CA (US); Jing Wang, Arcadia, CA (US); Chunyu Lu, Pasadena, CA (US)

(73) Assignee: 3M Cogent, Inc., Pasadena, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 12/500,554

(22) Filed: Jul. 9, 2009

(65) Prior Publication Data

US 2009/0268988 A1  Oct. 29, 2009

Related U.S. Application Data

(63) Continuation of application No. 11/473,155, filed on Jun. 21, 2006, now Pat. No. 7,580,567, which is a continuation of application No. 10/366,955, filed on Feb. 14, 2003, now Pat. No. 7,088,872.

(60) Provisional application No. 60/357,257, filed on Feb. 14, 2002.

(51) Int. Cl.
G06K 9/54 (2006.01)
G06K 9/00 (2006.01)

(52) U.S. Cl. ...................................... 382/305

(58) Field of Classification Search .......... 382/168–169, 382/228, 254, 258–259, 271–272, 303–305; 709/203, 224, 226, 229, 250; 345/502, 505, 345/546; 370/352, 375, 428, 458, 485; 358/455, 358/460, 522
See application file for complete search history.

(56) References Cited

U.S. PATENT DOCUMENTS

| 4,137,565 A | 1/1979 | Mager et al. |
| 4,315,310 A | 2/1982 | Bayliss et al. |
| 4,569,080 A | 2/1986 | Schiller |
| 4,784,484 A | 11/1988 | Jensen |
| 4,832,485 A | 5/1989 | Bowles |
| 4,833,724 A | 5/1989 | Goel |
| 4,924,085 A | 5/1990 | Kato et al. |
| 5,233,404 A | 8/1993 | Lougheed et al. |
| 5,245,672 A | 9/1993 | Wilson et al. |

(Continued)

FOREIGN PATENT DOCUMENTS

EP  0 098 607  7/1983

(Continued)

OTHER PUBLICATIONS

U.S. Appl. No. 60/357,557, entitled "Automatic Dredge System and Method of Operation," filed Feb. 15, 2002.

(Continued)

*Primary Examiner* — Amir Alavi

(57) ABSTRACT

In one embodiment, the present invention is a system for organizing data flow for two dimensional digital image processing. The system includes a memory access module for accessing an external memory containing image data to be processed, and a data flow organizer module for preparing a data stream from the input image data accessed by the memory access module. The data flow organizer module predicts future data needed for processing, and the memory access module pre-fetches the predicted data from the memory. A data processing module processes the pre-fetched data from the data flow organizer module. Address generation for accessing the memory is performed independent and in parallel with processing the pre-fetched data.

14 Claims, 19 Drawing Sheets

U.S. PATENT DOCUMENTS

| | | | |
|---|---|---|---|
| 5,307,345 A | 4/1994 | Lozowick et al. | |
| 5,416,573 A | 5/1995 | Sartor, Jr. | |
| 5,426,684 A | 6/1995 | Gaborski et al. | |
| 5,448,649 A | 9/1995 | Chen | |
| 5,517,419 A | 5/1996 | Lanckton et al. | |
| 5,528,355 A | 6/1996 | Maase et al. | |
| 5,579,278 A | 11/1996 | McLaury | |
| 5,596,454 A | 1/1997 | Hebert | |
| 5,613,014 A | 3/1997 | Eshera et al. | |
| 5,619,586 A | 4/1997 | Sibbald | |
| 5,621,516 A | 4/1997 | Shinzaki et al. | |
| 5,633,947 A | 5/1997 | Sibbald | |
| 5,751,836 A | 5/1998 | Wildes et al. | |
| 5,754,697 A | 5/1998 | Fu et al. | |
| 5,778,175 A | 7/1998 | Paul et al. | |
| 5,799,098 A | 8/1998 | Ort | |
| 5,809,180 A | 9/1998 | Kimura et al. | |
| 5,828,769 A | 10/1998 | Burns | |
| 5,887,079 A | 3/1999 | Endo et al. | |
| 5,900,993 A | 5/1999 | Betensky | |
| 5,937,090 A | 8/1999 | Kim | |
| 5,942,761 A | 8/1999 | Tuli | |
| 5,949,905 A | 9/1999 | Nichani et al. | |
| 5,996,061 A * | 11/1999 | Lopez-Aguado et al. | 712/207 |
| 6,002,815 A | 12/1999 | Immega et al. | |
| 6,011,860 A | 1/2000 | Fujieda et al. | |
| 6,038,226 A | 3/2000 | Ellersick et al. | |
| 6,043,900 A | 3/2000 | Feng et al. | |
| 6,138,212 A * | 10/2000 | Chiacchia et al. | 711/137 |
| 6,175,407 B1 | 1/2001 | Sartor | |
| 6,219,447 B1 | 4/2001 | Lee | |
| 6,249,360 B1 | 6/2001 | Pollard et al. | |
| 6,259,108 B1 | 7/2001 | Antonelli et al. | |
| 6,317,810 B1 * | 11/2001 | Lopez-Aguado et al. | 711/120 |
| 6,324,020 B1 | 11/2001 | Teng et al. | |
| 6,355,937 B2 | 3/2002 | Antonelli et al. | |
| 6,360,307 B1 | 3/2002 | Raftery et al. | |
| 6,384,832 B1 | 5/2002 | Muramatsu et al. | |
| 6,473,194 B1 | 10/2002 | Sakai | |
| 6,483,932 B1 | 11/2002 | Martinez et al. | |
| 6,505,905 B1 | 1/2003 | Krouss | |
| 6,618,076 B1 | 9/2003 | Sikthankar et al. | |
| 6,654,142 B1 | 11/2003 | Min | |
| 6,697,538 B1 | 2/2004 | Angenent et al. | |
| 6,870,538 B2 | 3/2005 | MacInnis et al. | |
| 6,879,709 B2 | 4/2005 | Tian et al. | |
| 6,912,638 B2 | 6/2005 | Hellman | |
| 6,928,195 B2 | 8/2005 | Scott et al. | |
| 6,956,608 B1 | 10/2005 | Shapiro et al. | |
| 6,980,286 B1 | 12/2005 | Feng | |
| 6,993,165 B2 | 1/2006 | McClurg et al. | |
| 7,020,591 B1 | 3/2006 | Wei et al. | |
| 7,081,951 B2 | 7/2006 | Carver et al. | |
| 7,088,872 B1 * | 8/2006 | Hsieh et al. | 382/305 |
| 7,095,880 B2 | 8/2006 | Martinez et al. | |
| 7,194,393 B2 | 3/2007 | Wei et al. | |
| 7,203,344 B2 | 4/2007 | McClurg et al. | |
| 7,267,799 B1 | 9/2007 | Borich et al. | |
| 7,277,562 B2 | 10/2007 | Zyzdryn | |
| 7,315,632 B2 | 1/2008 | Spycher et al. | |
| 7,418,123 B2 | 8/2008 | Giger | |
| 7,430,303 B2 | 9/2008 | Sefcik et al. | |
| 7,564,495 B2 | 7/2009 | Lee | |
| 7,580,567 B2 * | 8/2009 | Hsieh et al. | 382/169 |
| 7,587,064 B2 | 9/2009 | Owechko et al. | |
| 7,616,788 B2 | 11/2009 | Hsieh et al. | |
| 7,639,858 B2 | 12/2009 | Ross et al. | |
| 7,796,266 B2 | 9/2010 | Cohen et al. | |
| 7,840,062 B2 | 11/2010 | Boroczky et al. | |
| 7,876,934 B2 | 1/2011 | Georgescu et al. | |
| 7,912,528 B2 | 3/2011 | Krishnan et al. | |
| 8,131,477 B2 | 3/2012 | Li | |
| 2001/0014066 A1 * | 8/2001 | Koudo et al. | 369/47.45 |
| 2001/0038707 A1 | 11/2001 | Ohara | |
| 2002/0073211 A1 | 6/2002 | Lin et al. | |
| 2003/0013951 A1 | 1/2003 | Stefanescu et al. | |
| 2003/0025749 A1 | 2/2003 | Krouss | |
| 2003/0189571 A1 | 10/2003 | MacInnis et al. | |
| 2004/0046761 A1 | 3/2004 | Hellman et al. | |
| 2004/0088490 A1 * | 5/2004 | Ghosh | 711/137 |
| 2004/0102931 A1 | 5/2004 | Ellis | |
| 2004/0114829 A1 | 6/2004 | LeFeuvre et al. | |
| 2004/0172238 A1 | 9/2004 | Choo | |
| 2006/0019265 A1 | 1/2006 | Song et al. | |
| 2006/0224539 A1 | 10/2006 | Zhang et al. | |
| 2006/0245631 A1 | 11/2006 | Levenson et al. | |
| 2007/0140550 A1 | 6/2007 | Li et al. | |
| 2007/0183663 A1 | 8/2007 | Wang et al. | |
| 2007/0189582 A1 | 8/2007 | Hamza et al. | |
| 2007/0296863 A1 | 12/2007 | Hwang et al. | |
| 2008/0080768 A1 | 4/2008 | Li et al. | |
| 2008/0123931 A1 | 5/2008 | He et al. | |
| 2008/0159614 A1 | 7/2008 | He et al. | |
| 2008/0170770 A1 | 7/2008 | Suri | |
| 2008/0170778 A1 | 7/2008 | Luo | |
| 2008/0273771 A1 | 11/2008 | Hsieh et al. | |
| 2008/0292194 A1 | 11/2008 | Schmidt et al. | |
| 2009/0060335 A1 | 3/2009 | Rodriguez Serrano et al. | |
| 2009/0116737 A1 | 5/2009 | Kiraly et al. | |
| 2009/0148010 A1 | 6/2009 | Boroczky | |
| 2009/0154814 A1 | 6/2009 | Natan | |
| 2009/0161928 A1 | 6/2009 | Khamene et al. | |
| 2009/0171240 A1 | 7/2009 | Aguilar et al. | |
| 2009/0185746 A1 | 7/2009 | Mian et al. | |
| 2009/0220148 A1 | 9/2009 | Levy et al. | |
| 2009/0268988 A1 * | 10/2009 | Hsieh et al. | 382/305 |
| 2009/0299999 A1 | 12/2009 | Loui et al. | |
| 2010/0014718 A1 | 1/2010 | Savvides et al. | |
| 2010/0014755 A1 | 1/2010 | Wilson | |
| 2010/0027852 A1 | 2/2010 | Hsieh et al. | |
| 2010/0049674 A1 | 2/2010 | Zohar et al. | |
| 2010/0172579 A1 | 7/2010 | Reid et al. | |
| 2010/0178204 A1 | 7/2010 | Yin et al. | |
| 2010/0208951 A1 | 8/2010 | Williams et al. | |
| 2010/0304358 A1 | 12/2010 | Nie et al. | |

FOREIGN PATENT DOCUMENTS

| | | |
|---|---|---|
| WO | WO 96/13742 | 5/1996 |
| WO | WO 01/18741 | 3/2001 |
| WO | WO 2008/024778 | 2/2008 |

OTHER PUBLICATIONS

U.S. Appl. No. 60/915,363, entitled "Apparatus for Capturing a High Quality Image of a Moisten Finger," filed May 1, 2007.

Seul, Michael et al., "Practical Algorithms for Image Analysis," Cambridge University Press 2000, pp. 1-13.

Vincent, Luc, "Morphological Grayscale Reconstruction in Image Analysis: Applications and Efficient Algorithms," Transactions on Image Processing, vol. 2, No. 2, Apr. 1993, pp. 176-201.

Carlson, M.A., et al., "An Automated, Handheld Biosensor for Aflatoxin," Biosensors & Electronics 14 (2000), pp. 841-848.

Delmulle, Barbara S., et al., Development of an Immunoassay-Based Lateral Flow Dipstick for the Rapid Detection of Aflatoxin $B_1$ in Pig Feed, Journal of Agricultural and Food Chemistry, J. Agric. Food Chem. 2005, 53, pp. 3364-3368.

Tahir-Muhammad, Zarini, et al. "A Conductometric Biosensor for Biosecurity," Biosensors & Bioelectronics, Biosensors and Bioelectronics 18 (2003) pp. 813-819.

Niedbala, R. Sam, et al. "Detection of Analytes by Ummunoassay Using Up-Converting Phosphor Technology," Anal. Biochem. (2001), vol. 293, pp. 22-30.

\* cited by examiner

METHOD AND APPARATUS FOR TWO DIMENSIONAL IMAGE PROCESSING

CROSS-REFERENCE TO RELATED APPLICATION(S)

This patent application is a continuation of U.S. patent application Ser. No. 11/473,155, filed on Jun. 21, 2006 now U.S. Pat. No. 7,580,567, which is a continuation of U.S. patent application Ser. No. 10/366,955, filed Feb. 14, 2003, now U.S. Pat. No. 7,088,872, which claims the benefit of the filing date of U.S. Provisional Patent Application Ser. No. 60/357,257, filed Feb. 14, 2002 and entitled "HARDWARE ARCHITECTURE FOR TWO DIMENSIONAL IMAGE PROCESSING", the entire contents of which are hereby expressly incorporated by reference.

FIELD OF THE INVENTION

The present invention relates to image processing. More specifically, the present invention is directed to a method and apparatus for two dimensional image processing.

BACKGROUND OF THE INVENTION

Most of digital image processing algorithms are memory access intensive. For example, a 3×3 window mean filter algorithm with simplest software implementation would have 9 memory reads, 10 memory address calculations, 8 add operations, one divide operation, and one memory store operation for each pixel as follow:

$$OUT[i][j]=(IN[i-1][j-1]+IN[i-1][j]+IN[i-1][j+1]+\\IN[i][j-1]+IN[i][j]+IN[i][j+1]+IN[i+1][j-1]+IN\\{}[i+1][j]+IN[i+1][j+1])/9;$$

where OUT[i][j] is the output image gray scale value at row i and column j, and IN[i][j] is the input image gray scale value at row i and column j.

With initialization of the sum of 9 input image pixels, the above algorithm can be optimized as:

$$SUM=SUM\,B(IN[i-1][j-2]+IN[i][j-2]+IN[i+1]\\{}[j-2])+(IN[i-1][j+1]+IN[i][j+1]+IN[i+1][j+1]);$$

$$OUT[i][j]=SUM/9;$$

Here, there are still 6 memory read operations, one memory write operation, 3 add operations, 3 subtract operations, one divide operation, and 7 memory address calculations.

For a general-purpose microprocessor, the memory address calculation operation, memory read and write operations take a large portion of the executing instruction flow. Traditional microprocessors can be classified into three types from an architectural viewpoint, 1) General purpose CPU (CISC/RISC), 2) DSP and 3) Parallel Array processor.

General purpose CPU normally has one Arithmetic Logic Unit (ALU) to take care of all the data manipulations and address calculations in serial. A DSP has one or more simple Adders to update the data address registers at the same time, while making data calculation in main ALU. This feature can double or triple the speed of a one dimensional (1-D) filter with a single cycle Multiplier and Accumulator (MAC).

A parallel array processor has many similar simplified ALUs. The data to be processed is fed through a hardwired data-path. Many special-function processors like FFT/Motion estimation processors or so-called general-purpose systolic/wave-front processors share the same basic idea. However, these kinds of processors are typically inflexible, can do limited types of image processing operations, and take substantial silicon area. Another example of a computation intensive application is a histogram operation on an image. A histogram is the distribution of gray levels in a given input image. The histogram of gray levels provides a representation of the appearance of an image. Histogram based image enhancement or noise filtering method has been widely used in various image processing fields and proves very effective. Histogram equalization is the most widely known method for image contrast enhancement, and is described in J. S. Lim, "Two-Dimensional Signal and Image Processing", Prentice Hall, Eaglewood Cliffs, N.J. 1990. Furthermore, a conventional histogram extraction circuit has been disclosed in U.S. Pat. No 6,219,447 issued to Hyo-seung Lee, Apr. 17, 2001, the entire contents of which is hereby incorporated by reference.

Traditional histogram operations are also memory intensive. After initializing, for each image pixel, there will be one image memory address calculation, one image memory read operation, one histogram memory address calculation, one histogram memory read operation, one add operation, and one histogram memory write operation as: Histogram [Image [u][v]]++.

Therefore, there is a need for an efficient and fast method and apparatus for two dimensional (2-D) image processing that minimizes the memory access bottleneck.

SUMMARY OF THE INVENTION

The present invention is an efficient and fast method and apparatus for 2-D image processing. In one embodiment, the image processor architecture of the present invention lies between the class b and class c processors, described above. This architecture is more versatile and silicon-effective than a class c processor, at the same time, more efficient than a class b processor. In one aspect, the present invention is a system for two dimensional digital data processing comprising: a memory access module for accessing a memory containing image data to be processed; a data flow organizer module for preparing input image data accessed by the memory access module, wherein the data flow organizer module predicts future data needed for processing and pre-fetches the predicted data from the memory; and a data processing module for processing the pre-fetched data from the data flow organizer module, wherein address generation for accessing the memory is performed independent and in parallel with processing the pre-fetched data.

In one embodiment, the system includes a histogram module coupled between the data flow organizer module and the data processing module for calculating statistic information of the input image within a specified window.

In one embodiment, the data flow organizer module comprises: a cache memory for storing data; a memory table coupled to the cache memory for storing a plurality of image attributes; at least two read address generator units for generating data read address; at least two write address generator units for generating data write address; a multiplexor coupled to the at least two read address generator units and the at least two write address generator units for multiplexing the data read address and data write address; and synchronization logic for synchronizing the at least two read address generator units and the at least two write address generator units responsive to the stored plurality of image attributes.

In another aspect, the present invention is a method for two dimensional digital image processing comprising: predicating needed image data in advance; generating address for the needed image data by utilizing spatial locality information about an image stored in an image memory; retrieving the needed image data from the image memory; storing the image data in a data flow organizing module; processing the stored image data, wherein address generation for accessing the memory is performed independent and in parallel with processing the pre-fetched data; and removing the stored image data from the data flow organizing module after the data is used and is no longer needed.

BRIEF DESCRIPTION OF THE DRAWINGS

The objects, advantages and features of this invention will become more apparent from a consideration of the following detailed description and the drawings in which.

DETAILED DESCRIPTION OF THE INVENTION

The hardware architecture of the present invention is designed to efficiently process 2-D digital images, for example, fingerprint images, facial images, eye iris or retina images, as well as other data streams. This hardware architecture has efficient memory access units to handle memory read, memory write and complex memory address calculations. A data flow organizing unit can be programmed to generate data stream for 2-D image processing. Combined with a pipeline data flow processing unit, this architecture can efficiently implement most of the 2-D digital image processing algorithms and can efficiently implement most of the 1-D digital signal processing algorithms. The architecture separates the data processing and address generation phases and uses data flow and pipeline methods to efficiently process a two dimensional image.

Typically, most processing done on a 2-D gray image is window based. Typically, for each basic processing area, all the input data is in the neighboring (window) area. This is referred to as spatial locality. Spatial locality feature of image processing techniques is utilized in the present invention to speed up the processing of the image. An address engine explores the regularity inside the window operation.

Figure 2:
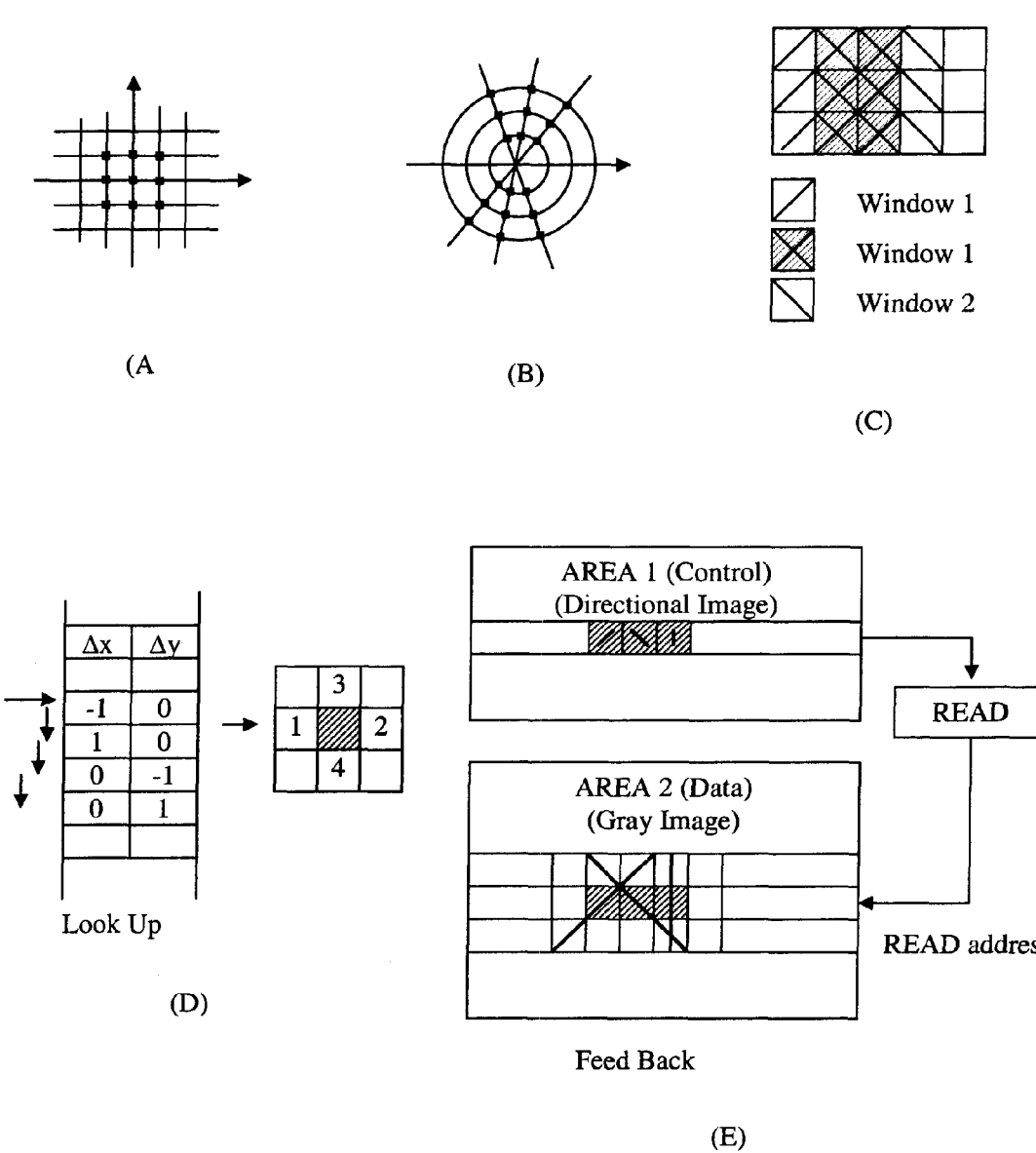
FIGS. 2A-2E are exemplary address operations for image windows, according to one embodiment of the present invention.

Typically, address operations of image windows may be classified into five classes:

a. Line/Column scan in Cartesian coordinates (Shown in FIG. 2A),
   b. Line/Column scan in Polar coordinates (Shown in FIG. 2B),
   c. Recursive scan with header (Shown in FIG. 2C),
   d. Lookup table (Shown in FIG. 2D), and
   e. Feedback (Shown in FIG. 2E).

FIG. 2A depicts an exemplary linear scan operation, where pixels are scanned from left to right and from top to bottom. This scheme is typically used to calculate the average/variance of a group of pixels. FIG. 2B illustrates an exemplary linear scan in Polar coordinates, where pixels are scanned from 0 degree axis line to 360 degree axis line (e.g., with steps of 20 degree). In each line, pixels may be scanned from distance 1 to distance 10. This scanning method is typically used to calculate the directional statistics inside a given window. FIG. 2C shows an exemplary recursive scan with header for a processing window of size 3*3. In this case, one full window (3 columns) is scanned first as header, then only the new pixels (the fourth column) are scanned for a subsequent window. FIG. 2D depicts an exemplary look-up table-based addressing scheme. In this scheme, the relative address (to the center of the window) is provided directly. The dark pixel shown is the window center, and pixels are scanned in order of 1, 2, 3, 4. The feedback addressing method of FIG. 2E is explained in detail below.

In one embodiment of the present invention, the address scan modes are controllable through a number of internal registers and control data. In other words, the scan policy of each pixel can be set to be different in the architecture of the present invention. This flexibility is made possible by a versatile address engine. Since all the possible data to be used in certain time can be predicated in advance, the date can be pre-fetched from the external memory to a cache. In a way, the lifetime of each data is determined so that a relatively small cache memory can be used as a virtual, large, and fast memory.

Figure 1:
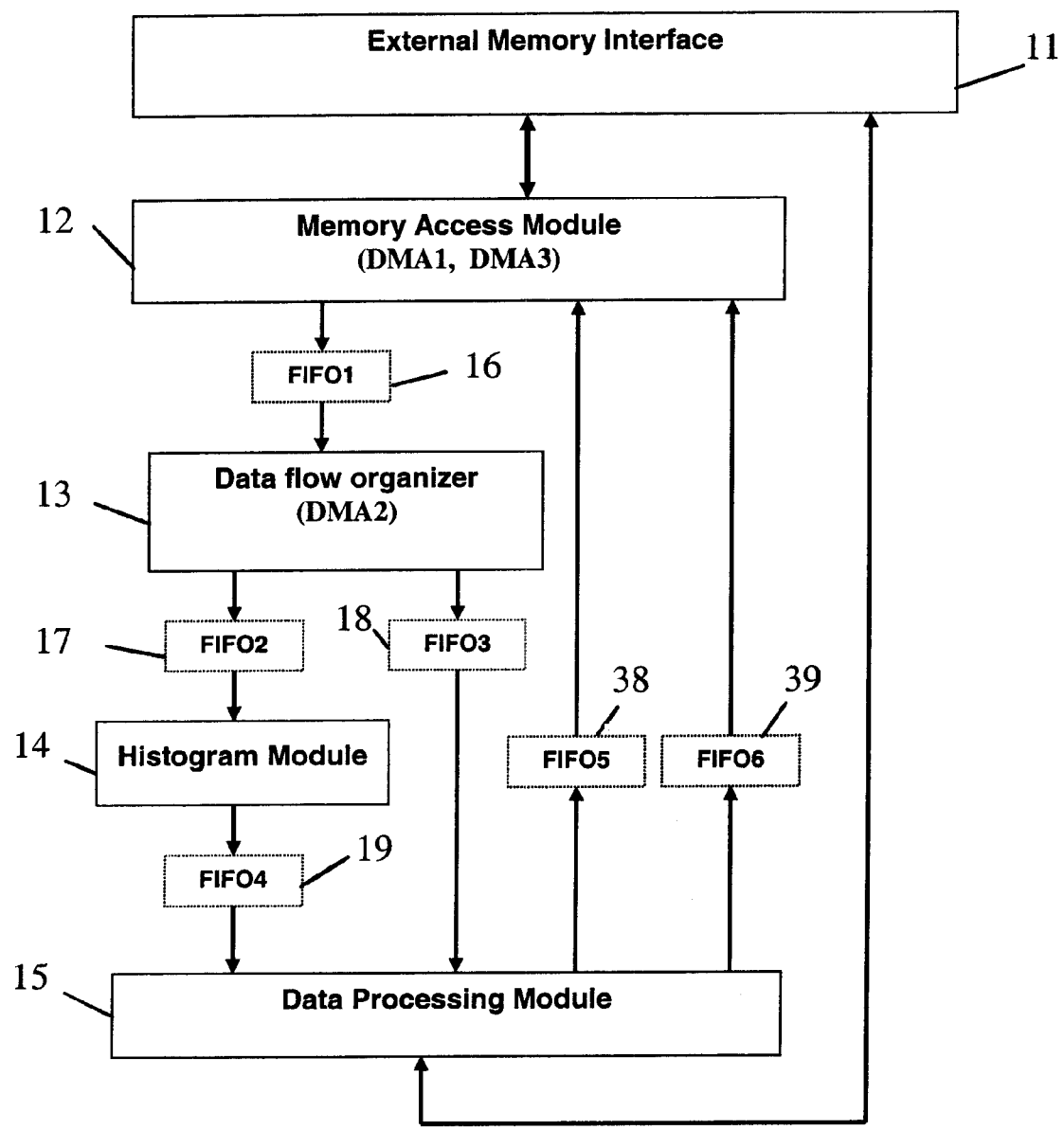
FIG. 1 is an exemplary top level diagram of the hardware architecture, according to one embodiment of the present invention.

FIG. 1 is an exemplary top level diagram of the hardware architecture including four major modules, a memory access unit 12 (DMA1,3), a data flow organizer 13 (DMA2), a histogram module 14, and a data processing module 15 (PIPE). Each of these modules has some registers to control its mode of operation, and FIFOs to regulate data transfers. The histogram module is used to calculate statics about the input image and is an optional component of the present invention.

Figure 3:
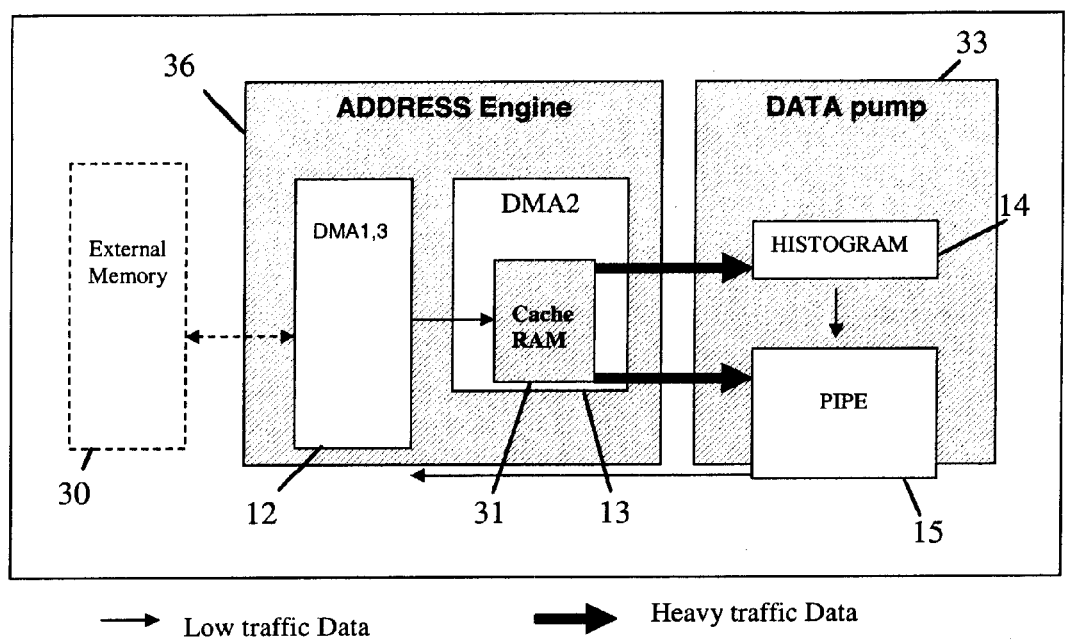
FIG. 3 is an exemplary architecture for a 2-D image processor, according to one embodiment of the present invention.

FIG. 3 depicts an exemplary architecture for a 2-D image processor, according to one embodiment of the present invention. This architecture has two key points. First, it divides the process into a pipelined data pump 33 and an address engine 36. Data pump 33 includes PIPE 15 and an optional histogram module 14. Address engine 36 includes DMA1,3 module 12 and DMA2 module 13. Data pump 33 handles data manipulation, and address engine 36 generates the address of the data to be processed. Data address generation (AG) is performed by utilizing information about 2-D image processing. The second point is that the architecture uses the spatial locality feature of image processing techniques to increase the data throughput and decrease the traffic on the system bus. Since all the needed data in certain time can be predicated in advance, the needed data is stored in a data flow organizing module and is kept there while the data is still in use. The data is then removed after it is used and is no longer needed.

DMA1,3 module is responsible for interfacing with external memory, which is typically a large and relatively slow memory, through the memory interface unit 11. Therefore, the traffic between DMA1,3 and outside memory needs to be streamlined as much as possible. The data read from DMA1,3 module 12 is sent to the cache RAM 31 of DMA2 module 13 through FIFO1 16 (shown in FIG. 1). The data to be written to the external memory 30 is from PIPE module 15 through FIFO5 38 and FIFO6 39 (shown in FIG. 1). DMA1,3 module 12 generates the read and write addresses for the external memory 30 based on its registers=contents. A function of the DMA1,3 module 12 is to read input data from the memory and write the processed data back to the memory, according to predefined parameters. In one embodiment, DMA1,3 can read up to four input image data and write up to two image data at the same time.

The function of the DMA2 (data flow organizer) module 13 is to generate data flows for PIPE unit 15 and histogram unit 14. The input to this unit is from DMA1,3 module 12, where images are read from external memory 30. Typically, most image processing algorithms access a single input image several times to re-process the processed image. That is, with an N by N image, the total memory read accesses will be T×N×N, where, T is larger than 1. The combination of DMA1,3 module 12 and DMA2 module 13 makes it possible to read the input image data from external memory preferably only once. This scheme greatly reduces the bandwidth requirement for the external memory. Because reading data from the internal buffer inside data flow organizer module is much faster than reading data from the external memory.

The core of DMA2 module 13 is a cache RAM 31. The input data of the cache RAM comes from DMA1,3 module 12. The Output data of the cache RAM is sent to histogram module 14 (through FIFO2 17), to PIPE module 15 (through FIFO3 18), or sent back to DMA2 module 13 to control the read operations. Both the read address and write address are generated by DMA2 module. The output data is in designated and possibly complex order defined by the control registers. Normally, the output throughput is about 10 times the input throughput.

The histogram module 14 calculates statistic information for the input image within a specified window. The pipelined architecture of this unit makes it possible to process one pixel per every clock cycle. The background masking and noise elimination features make this unit powerful to process noisy input image. Histogram module receives input from DMA2 module 13, and calculates a histogram of the image and computes some indirect statistics based on the histogram. It then sends the results to PIPE module 15 through FIFO4 19. PIPE module then performs complex data manipulations based on the data from DMA2 and histogram module. In one embodiment, PIPE module 15 is a simplified RISC machine. It includes its own instruction set, RAM, and ROM. The output of PIPE module is sent to DMA1,3 module through FIFO5, FIFO6, and then back to the external memory 30. In one kind of image processing procedure, the registers of all the modules need to be initialized. That is, DMA1,3 needs to be told where the input images are, and the location that the output image needs to be stored. Similarly, DMA2 needs to know how to re-scan the input image and feed the output data to the histogram module or the PIPE module. Also, the PIPE module needs to know what kind of operations should be performed on the data fed from the pipeline.

Data traffic in FIFO1, FIFO4, FIFO5 and FIFO6 is relatively low, while most of the data traffic occurs in FIFO2 and FIFO3. These are typically one-cycle high speed cache RAM read operations. As a result, the heavy traffic is moved from slow external memory to the high speed cache RAM. With instruction level data flow managing features, the data processing module of the present invention can process the data flow efficiently.

Figure 4A:
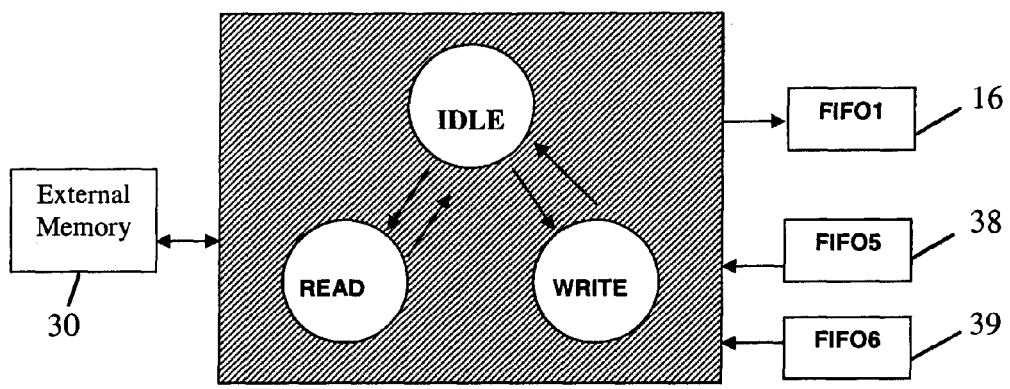
FIGS. 4A-4C are exemplary block diagrams for a memory access module, according to one embodiment of the present invention.
Figure 4B:
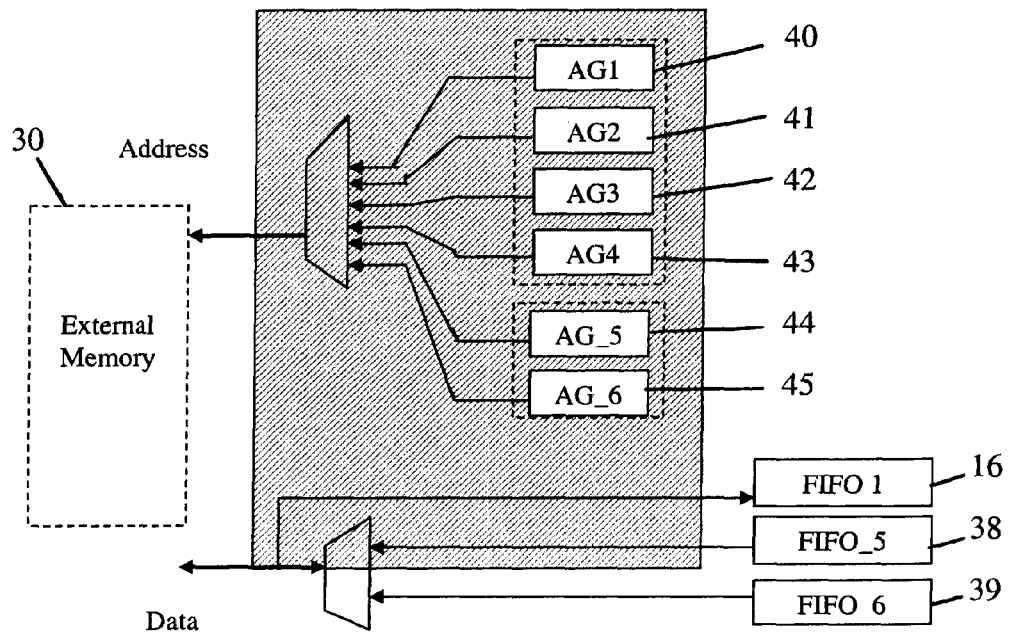

DMA1,3 module 12 is responsible for interfacing with external memory 30. Data read from external memory is sent to the data flow organizer module through FIFO1. Data to be written to the external memory is from data processing module through FIFO5 and FIFO6. This Memory access module has three states, READ, WRITE and IDLE, as shown in FIG. 4A. After Reset, the module is in IDLE state. When in READ state, the module reads data from external memory and writes the date to FIFO1. FIG. 4B is a simplified block diagram of the DMA1,3 module. Memory address for a read operation is generated by one of AG1 40, AG2 41, AG3 42, or AG4 43 units. When in WRITE state, the module reads data from FIFO5 38 or FIFO6 39 and writes the data to the external memory. The memory address for the data to be written is generated by the AG5 unit 44 for FIFO5 and AG6 unit 45 for FIFO6, as shown in FIG. 4B.

Figure 4C:
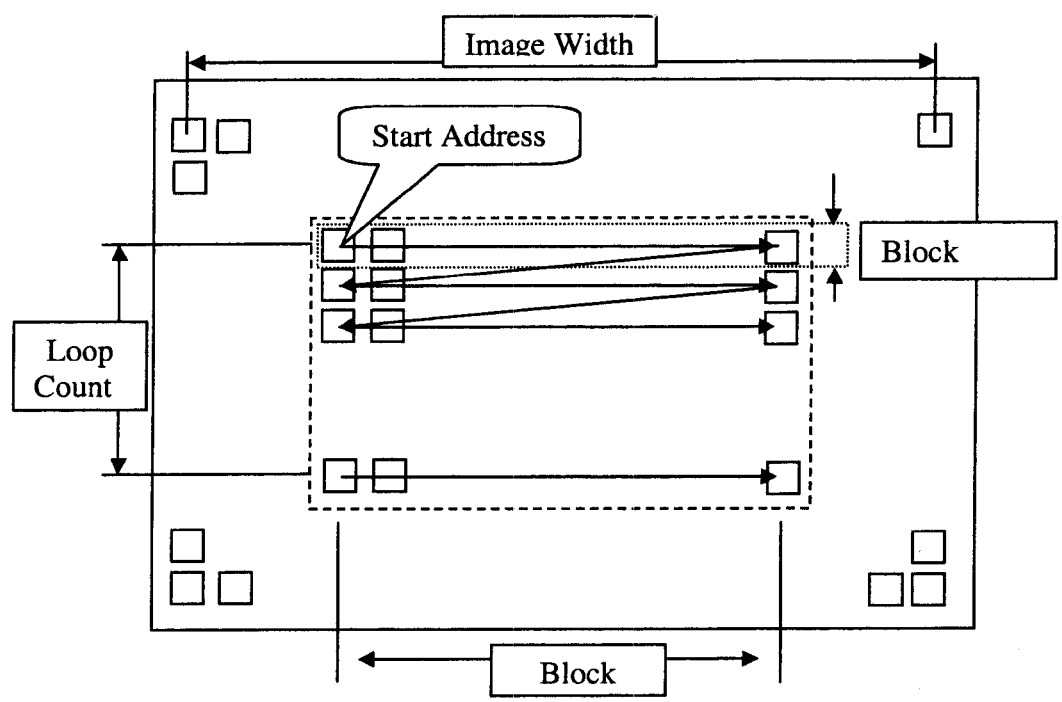

The empty/full status bits of FIFO1, FIFO5, FIFO6 control the transitions between the three states. The basic function of each AG unit is block scanning. In one embodiment, two types of scan modes are included in DMA1,3 module, line scan mode and column scan mode. Referring to FIG. 4C, memory address is generated sequentially from left to right, and from top to bottom in line scan mode. In case of column scan mode, address is generated sequentially from top to bottom first, then from left to right.

Figure 5A:
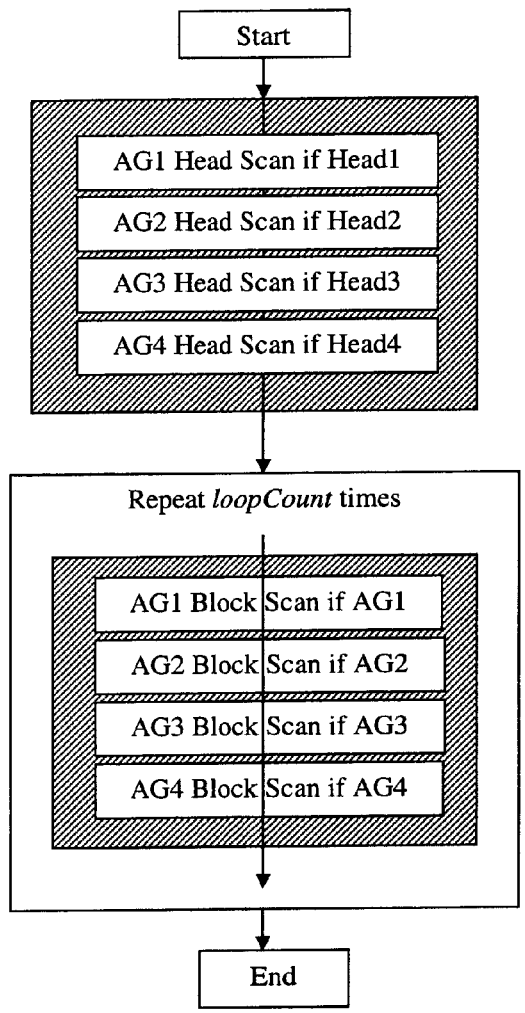
FIGS. 5A-5C are exemplary block diagrams for address selection strategy of a memory access module, according to one embodiment of the present invention.
Figure 5B:
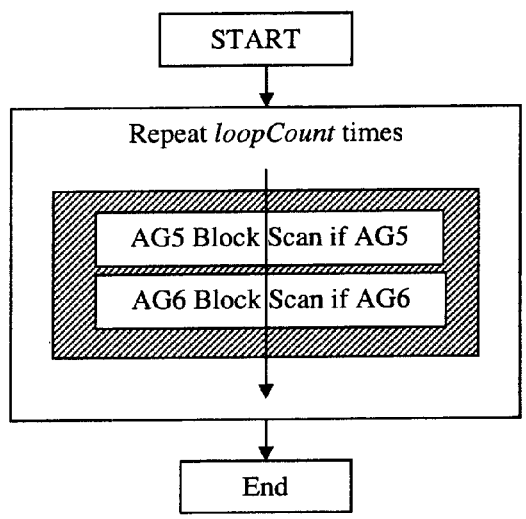

The read address is generated sequentially by AG1, AG2, AG3 and AG4 units of FIG. 4B (each can be enabled or disabled separately). The data read from the external memory is pushed into FIFO1. The read address selection strategy from AG1, AG2, AG3, AG4 is shown in FIG. 5A. The write address is generated by AG5 or AG6, depending on the status of the FIFO5 and FIFO6 (each can be enabled or disabled separately). The data to be written out is read from FIFO5 or FIFO6. The address selection mechanism of AG5 and AG6 is simpler and is shown in FIG. 5B.

Figure 5C:
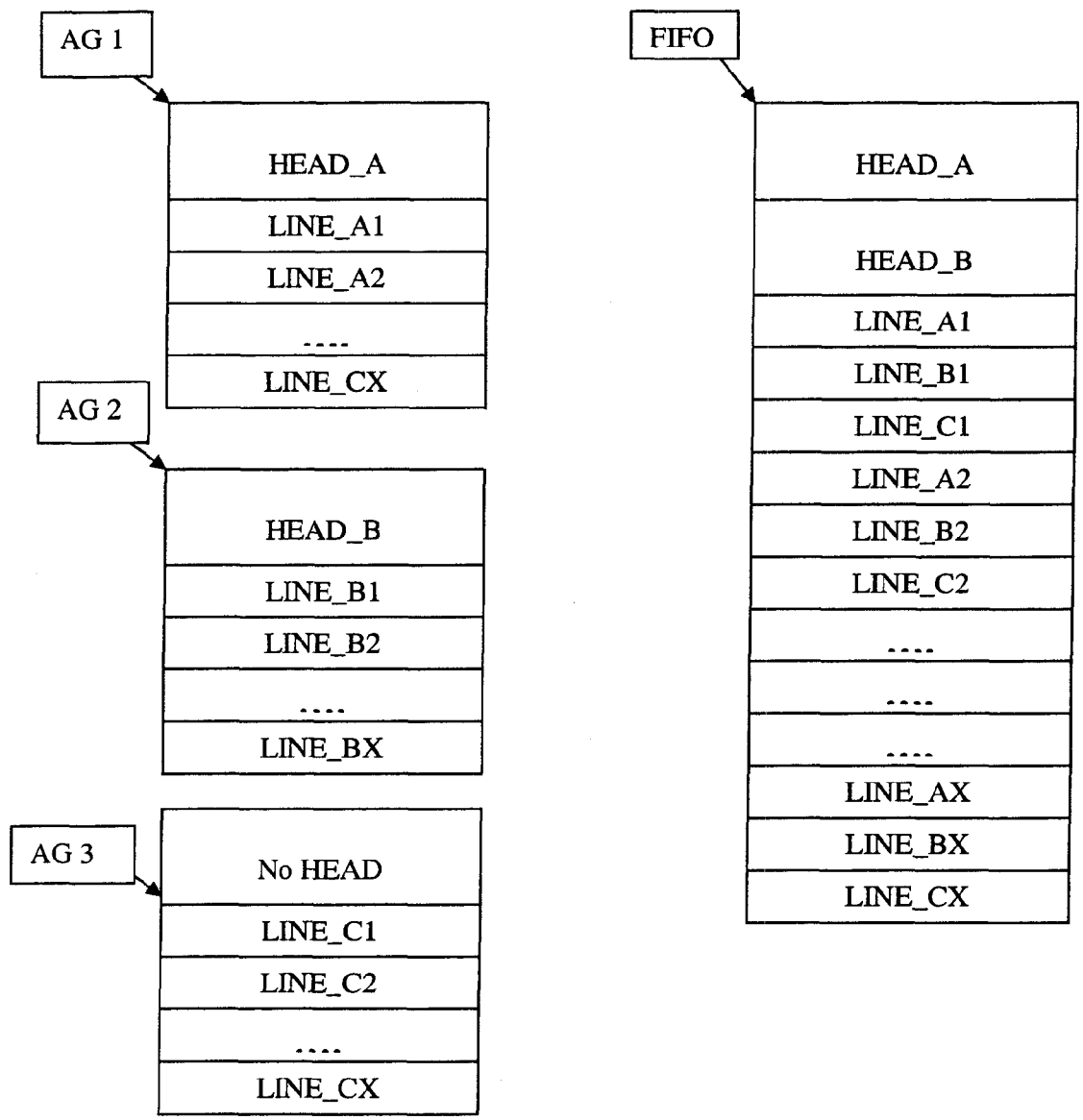

FIG. 5C illustrates a simplified example of the operation of DMA1,3 module. In this example, three AG units, AG1, AG2, AG3 are used. Each AG unit points to an AREA, and AG1 and AG2 have a HEAD flag set. Assuming the block size is the same as the image width, the expected data sequence in FIFO1 is as shown in FIG. 5C. As shown on the left, there are three data types to be read by DMA1, using AG1, AG2, and AG3, respectively. After the read operation the data is arranged as shown on the right. In this example, HEAD means a rectangle image area and Line means a rectangle image area with a height of one pixel. The reason for using an image width for a basic transfer block, instead of a single pixel, is to increase the data transfer efficiency if the external memory supports burst mode. When in line scan mode, the address is generated sequentially from left to right first, then from top to bottom.

Figure 6A:
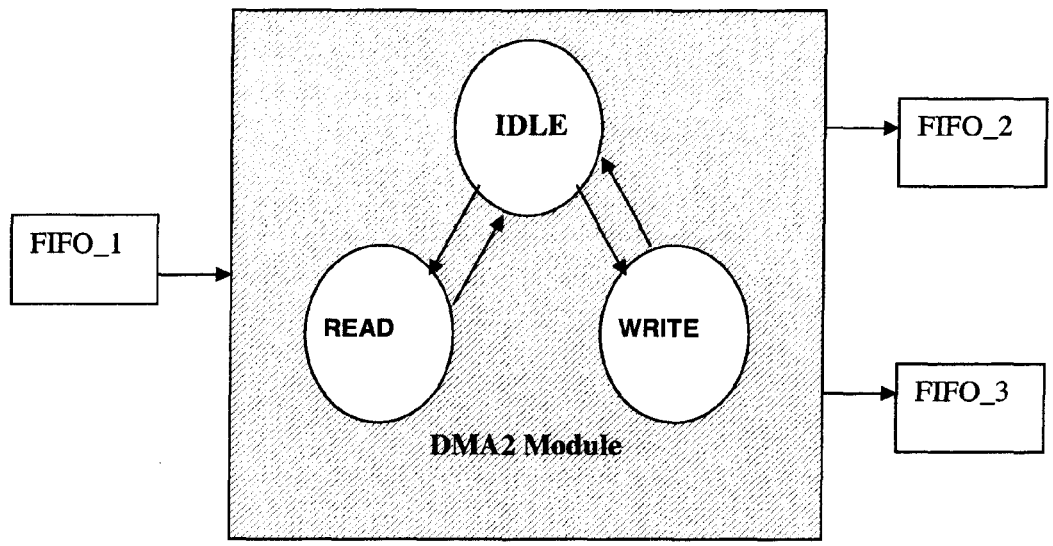
FIGS. 6A-6B are exemplary block diagrams for a data flow organizer module, according to one embodiment of the present invention.
Figure 6B:
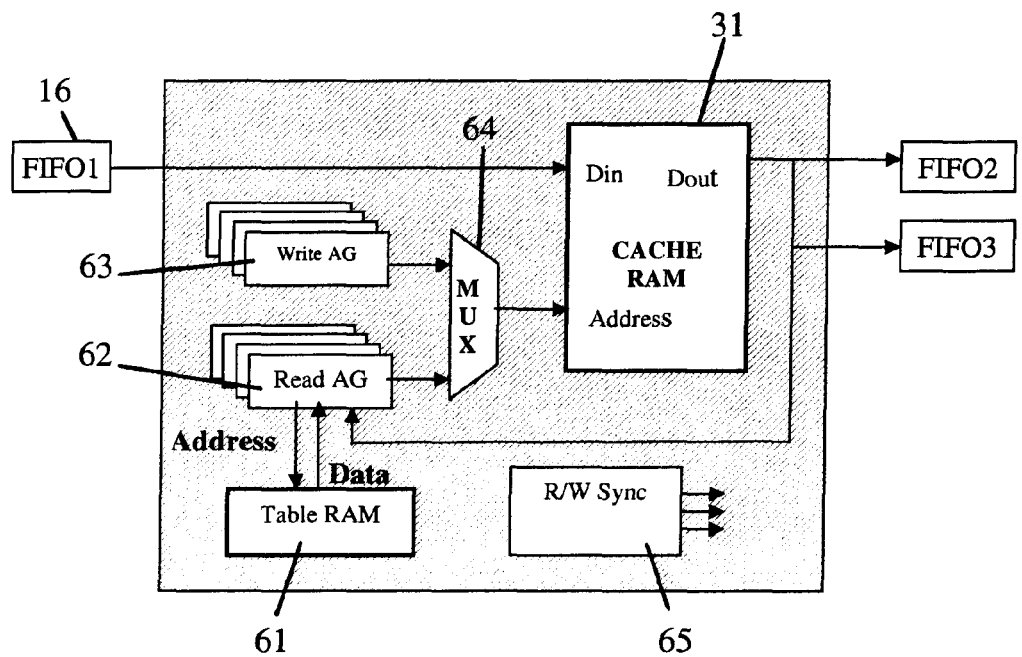

DMA2 module 13 is responsible for preparing and writing the data to FIFO2 and FIFO3 (see FIG. 1). Once a data is read in from FIFO1, the data can be used many times without being read in from FIFO1 again. FIG. 6A illustrates the internal state diagram of DMA2 module, including three states, READ, WRITE and IDLE. FIG. 6B illustrates a simplified structure of DMA2 module 13. As shown, DMA2 module has a CACHE RAM 31, a TABLE RAM 61, four Read address generators (AGs) 62, four write AGs 63, a multiplexor 64, and control and synchronization logic 65. TABLE RAM 61 is used as a mathematical function generator. In one embodiment, the address for the data stored in the TABLE RAM 61 is the angle of some the image features (e.g., line, direction of gray scale change, etc.), and the data stored at that address is the value of for example, the SIN(address), or Tan(address). Different mathematical functions may be stored in the TABLE RAM, as needed.

After Reset, DMA2 module is in IDLE state. When in READ state, DMA2 module controls read data from FIFO1 to internal CACHE RAM 31, the address of the data read is generated by one of the four Read AGs. When in WRITE state, DMA2 module controls write data to FIFO2 or FIFO3 from internal CACHE RAM. The empty/full status of FIFO1, FIFO2, FIFO3, and the internal data dependencies between Read/Write (pre-defined in control registers) control the transition between the three states. One of the functions of DMA2 module is to re-order the input data to a pre-defined order to be used in the processing unit.

Once data is written in CACHE RAM 31 from FIFO1, it can be read out as many times as needed. In this way, the throughput of FIFO2, FIFO3 can be enhanced. From a data path viewpoint, the DMA2 module can be seen as an active cache. It has a logical large storage capacity, and it knows what data will be needed in future and what data is no longer needed. Thus, the cache can make accurate expiration/update strategy. The DMA2 module pushes data out, instead of waiting for a data pump data request. For this purpose, three key techniques are included in this module, a large logical memory, a NEVER-MISS cache by means of read/write synchronization, and a versatile re-scan of the input data.

Figure 7:
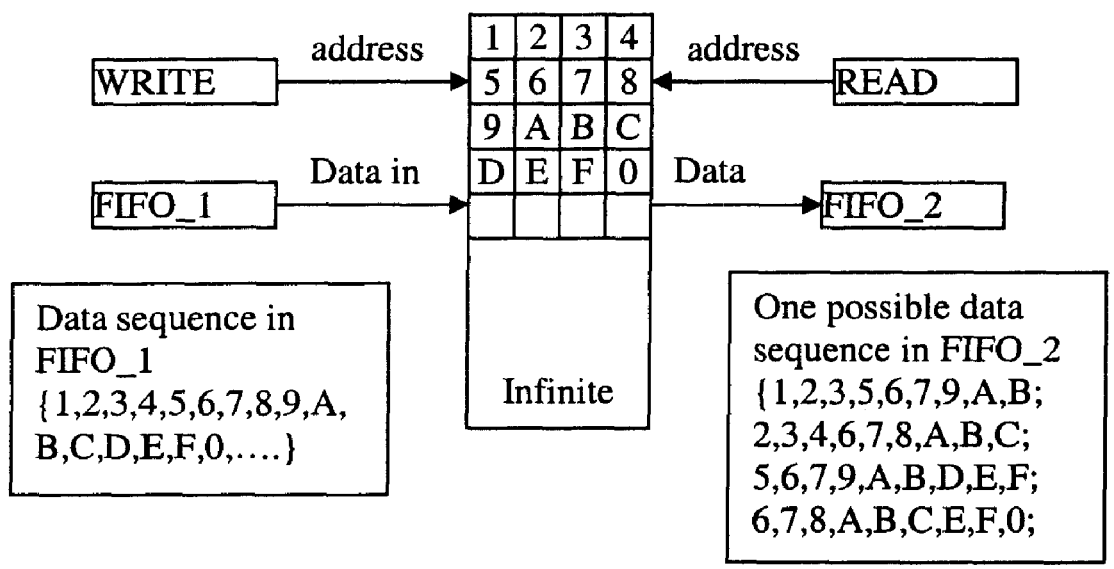
FIG. 7 is an exemplary illustration of a data flow organizer module logical operation, according to one embodiment of the present invention.

With the help of read/write synchronization, DMA2 module includes four large size virtual (logical) memories. Referring to FIG. 7 for illustration of DMA2 logical operation, each of the four WRITE AGs can generate appropriate address to write one type of full image into one of the four virtual memories. A WRITE AG operates from left to right and from top to bottom, sometimes with a HEAD block passed before the normal scanning, similar to DMA1,3. Each of the four READ AGs can read needed data from the four logical full images. The READ AGs are more complex than the WRITE AGs, and are explained below. In short, after synchronization, the READ AGs would be reading data from a virtual memory with the full image cached to the virtual memory, while WRITE AGs would be writing to a virtual memory large enough to buffer the full image.

Figure 8:
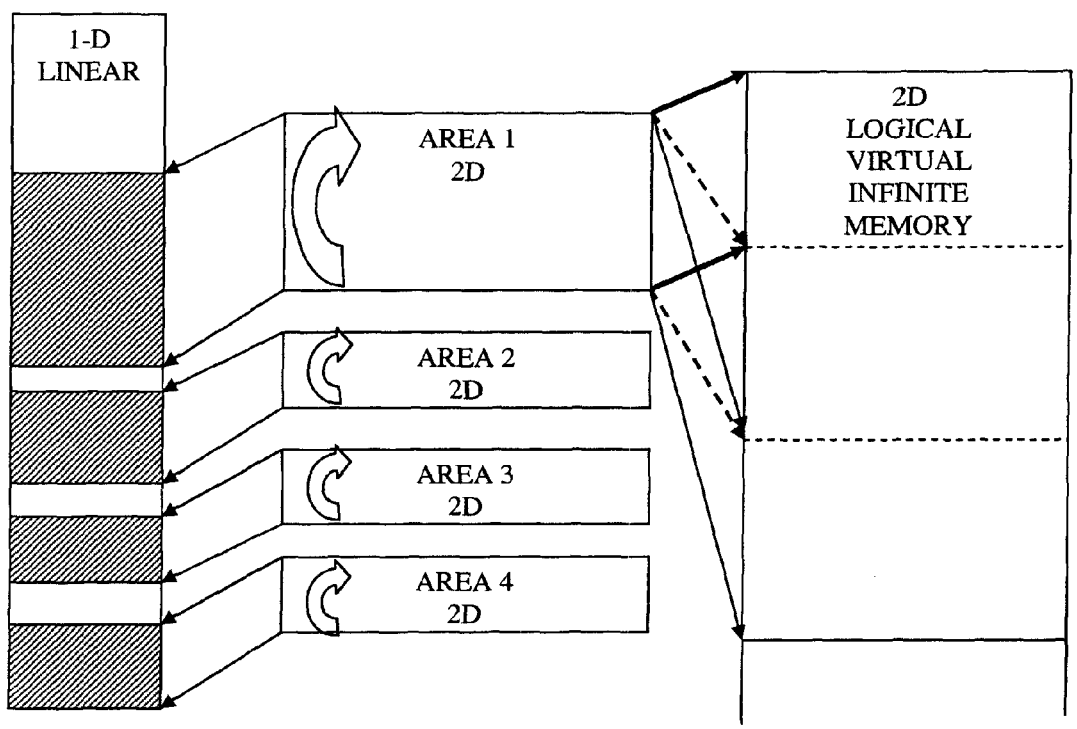
FIG. 8 is an exemplary block diagram depicting the logical partitioning of the memory of a data flow organizer module, according to one embodiment of the present invention.

FIG. 8 is an exemplary block diagram depicting the logical partitioning of the DMA2 memory, according to one embodiment of the present invention. DMA2 module includes a memory, such as a RAM. This memory is divided to four logical block called AREAS. Each AREA includes three programmable parameters, START_ADDRESS, physical WIDTH, and physical HEIGHT. The first parameter determines the offset of each AREA, and the latter two parameters determine the size of each AREA. Each AREA can be mapped further to a logical large HEIGHT virtual 2-D memory by logically connecting the end of that AREA to its start, while the WIDTH stays the same. For example, line HEIGHT and line 0 are in the same physical location and up to four large size logical 2-D AREAs may be obtained. One challenge of simulating large memory with small memory is making sure that the data is in the memory when needed. The present invention achieves this by means of a data read/write synchronization technique.

In practice, each AREA can hold different kinds of image data. However, the data has internal logical relationship in every corresponding point (pixel). For example, AREA1 may hold the RED component of input color image, AREA2 may hold the GREEN component, and AREA3 may hold the BLUE component. The same logical 2-D coordinate (X,Y) in three different AREAS represents different attributes of the same physical image point. Each AREA has its own local synchronization mechanism. The system level synchronization is a logical combination of the synchronization mechanism of the four AREAs and the Empty/Full status of the three FIFOs.

As shown in FIG. 6B, a dual port cache RAM may make this control problem easier by having one port for read, and the other port for write. In one simulation test using a single port RAM, about 10% performance lost and 40% decrease in silicon size is achieved. This results in a substantial decrease of silicon cost and power consumption. In one embodiment, a single-port RAM is used.

Figure 9:
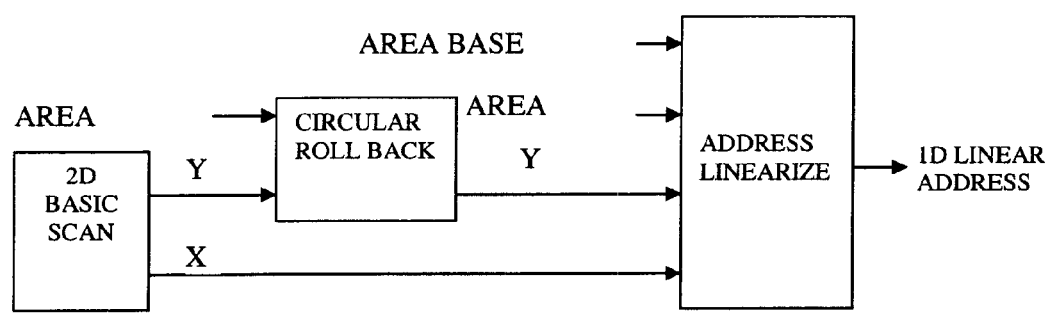
FIG. 9 is an exemplary diagram depicting the relationship between 2-D address and physical address of a data flow organizer module, according to one embodiment of the present invention.
Figure 10:
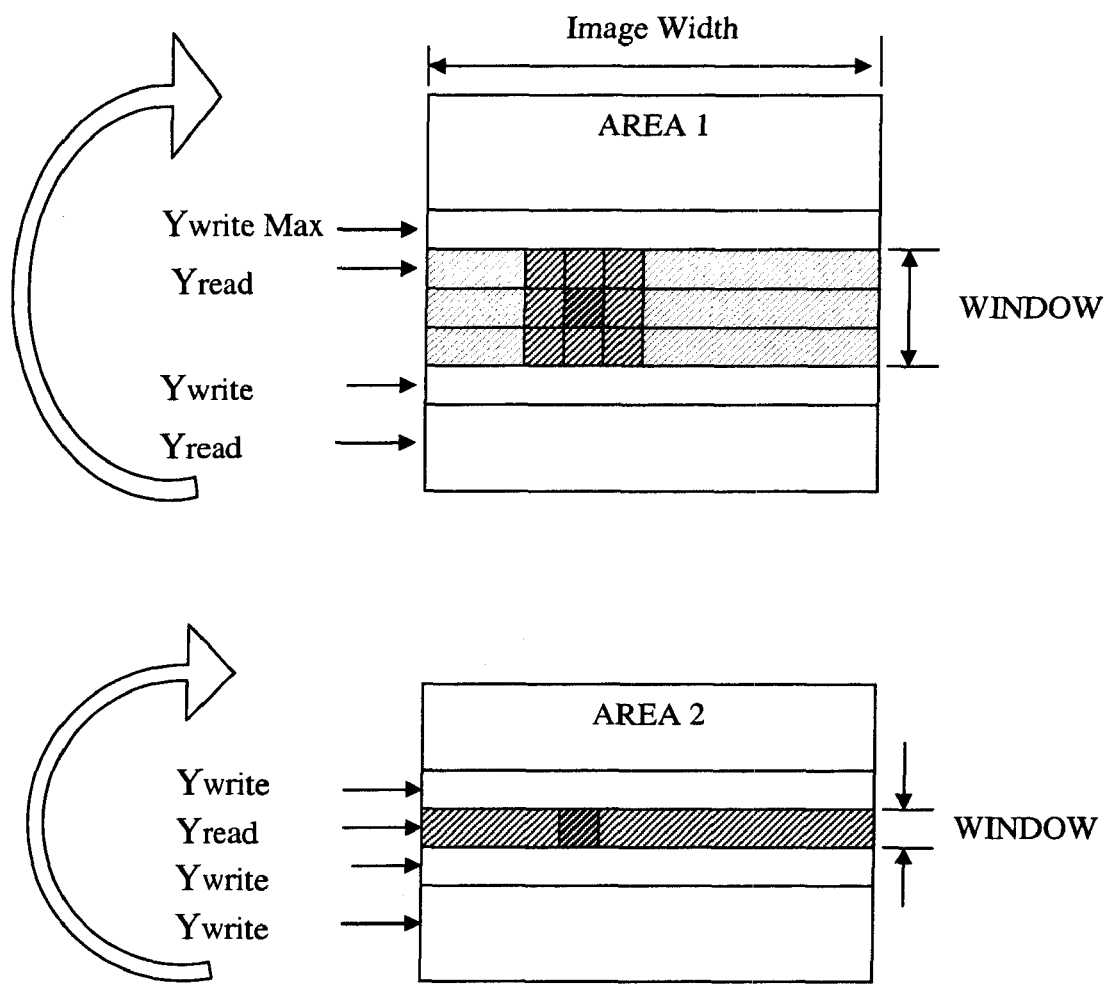
FIG. 10 is an exemplary diagram depicting the address operation of a data flow organizer module, according to one embodiment of the present invention.

Referring to FIGS. 8-10, each AREA has a physical AREA WIDTH and physical AREA HEIGHT that determines its size. For simplicity, the synchronization technique is based on physical WIDTH, that is, the granularity is the physical WIDTH for each AREA. Each AREA has one WRITE address pointer and one or more READ address pointers. Each READ address pointer has one programmable attribute named WINSIZE that represents the AREA size of possibly used neighboring pixels. For example, the WINSIZE of 3*3 filtering operation should be 3. Thus, Parameters WINSIZE and AREA HEIGHT fully determine the relative synchronous relationship between the READ and WRITE address pointers. For simplicity, a 2-D address pointer denoted as (Xread, Yread) and (Xwrite, Ywrite) is used. The relationship between 2-D address and physical address is illustrated in FIG. 9. The synchronization equations are as follows:

$$Yread < Ywrite - WINSIZE \quad [1]$$

$$Ywrite < Yread + (AREA\ HEIGHT\ B\ WINSIZE) \quad [2]$$

Figure 11:
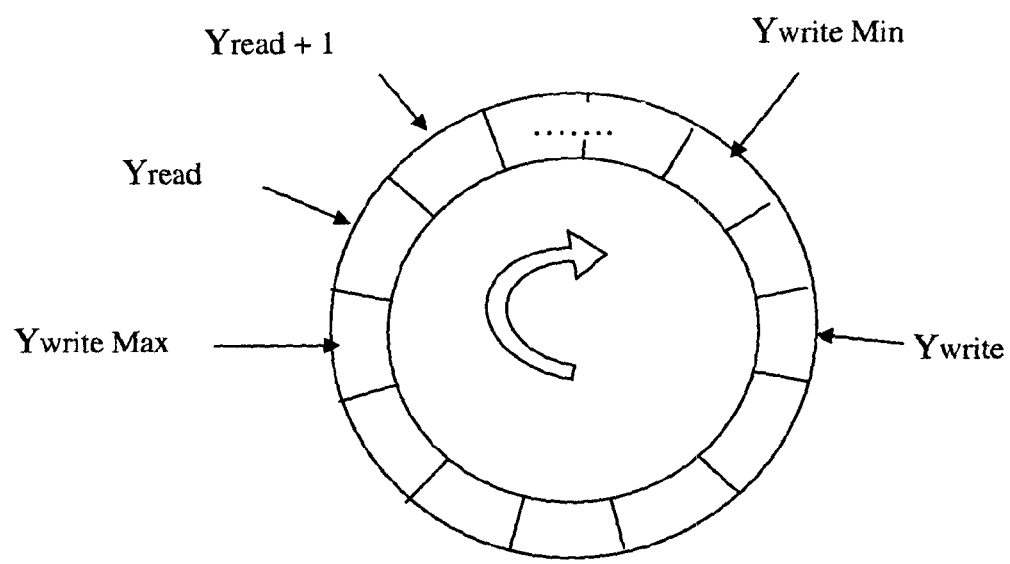
FIG. 11 is an exemplary diagram depicting the address operation of a data flow organizer module, according to one embodiment of the present invention.

The first equation means WRITE pointer should always be at least 1 WINSIZE lines ahead of READ pointer. This is achievable because the read operation possibly needs all image data in WINSIZE*WIDTH area, that should be made available. The second equation means WRITE address pointer cannot change to overwrite the data before the data is expired, as shown in FIG. 10 and FIG. 11. This is also achievable because data in that area may still be used and should be kept.

FIG. 10 is an exemplary 2-D illustration of a circular buffer. Circular buffer is a technique for mapping a physical memory with a limited size to a practically infinite size virtual memory. When the read/write operation reaches the end of physical memory area, the read/write pointers return to the beginning of that area to continue reading/writing. Ywrite stands for the current write address and Yread stands for the current read address. Ywrite_min means the first line that has been written but hasn't been read out. Ywrite_max is the first line that has been read out and can be wrote in. In the case of directional circular addressing, Ywrite should always be in an area from Ywrite_min to Ywrite_max, while Yread should always be in an area from Ywrite_max to Ywrite_min. A synchronization circuit ensures this condition.

FIG. 11 is an exemplary diagram depicting the address operation of a data flow organizer module using a circular buffer. Both read and write operations are sequential in this case. A control circuit ensures that reading from each memory cell is performed later than writing to that memory cell. Also, writing new data to any of the cells is not allowed before the memory cell content is read out. In FIG. 11, Ywrite represents the current write address, Yread stands for the current read address, Ywrite_max is the last memory address that can be written (that is, its content has been read out and no longer needed), and Ywrite_min is the first memory address with a valid content (that is, the data has been written, but hasn't been read).

The results of the above equations have four possible combinations.

A. Both of the above two equations hold. In this case, both a read operation from the and a write operation to the memory can be performed. Whether to read or to write depends on the outside FIFO status.

B. Equation [1] is false while Equation [2] holds. In this case, a read operation cannot be executed because not all the data to be used is written in the memory. The write operation can only be executed when equation [1] holds true.

C. Equation [2] is false while Equation [1] holds. This means that a write operation cannot be executed at this time, because the old data is still (possibly) in use and there is no space for new data. The read operation can only be executed when some lines of data expire and equation [2] holds.

D. Both equations are false. This means that the physical memory size is smaller than WINSIZE lines of image. This condition should not happen. However, the full image may be divided into several smaller overlapped pieces in width with same WINSIZE or reduced WINSIZE.

In short, all data with logical Y coordinate lower than Yread expire and can be updated. WINSIZE lines of data above Yread should be written before they are read. The only exception is at the end of the entire image, where the "<" in equation [1] should be "<=".

Re-scan is one way to read out data inside each processing window at a pre-defined order. In one embodiment, four most scan modes (shown in FIGS. 2A-2D) are included in DMA2 module. Each of them can be controlled by programmable parameters.

a. Line/Column scan in Cartesian coordinates.
b. Line/Column scan in Polar coordinates.
c. Recursive scan with header.
d. Lookup table.

All the four scan modes are controllable through programmable registers. In addition, the scan modes can be further controlled by the image data in pixel-wise manner. That is, the re-scan policy of each pixel can be different. This is controlled by a versatile re-scan address engine. This is done by means of a feedback mechanism, as shown in FIG. 2E. As mentioned earlier, there are four logical AREAs. Data in each AREA can be either basic image data or re-scan control parameter data. For each processing step, re-scan control data is first fetched and fed to a respective AG to determine the re-scan method of its corresponding pixel. For example, when using two AREAs, one AREA stores gray level of each image pixel, the other AREA stores local direction of each image pixel. For each pixel, a re-scan can be performed in the gray level AREA based on the specific direction of that pixel.

Scan modes a, b, and c are simpler and are depicted in FIGS. 2A-2C. In case of scan mode d, a RAM Look Up Table (LUT) is used to store the pre-defined [Dx, Dy] array. For each pixel, an image attribute data field defines the start address and scan length in the LUT of the corresponding point.

Figure 12A:
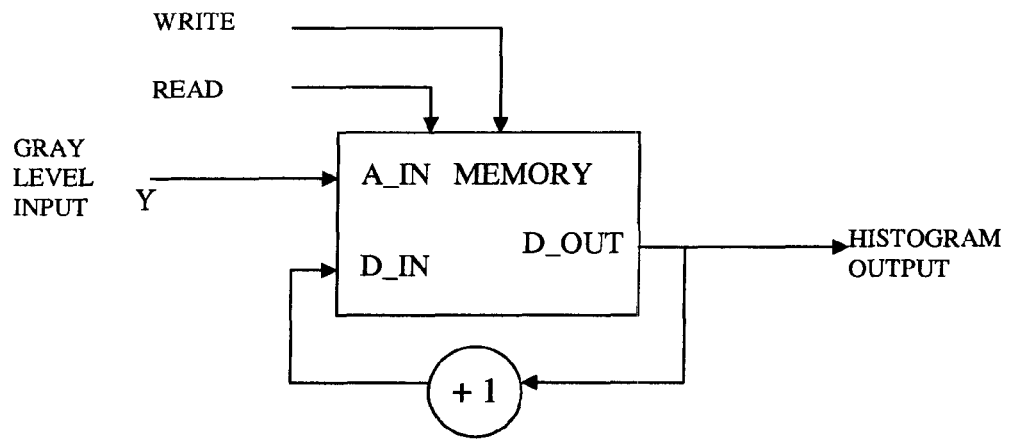
FIG. 12A is a block diagram of a typical histogram data extraction unit, according to prior art.
Figure 12B:
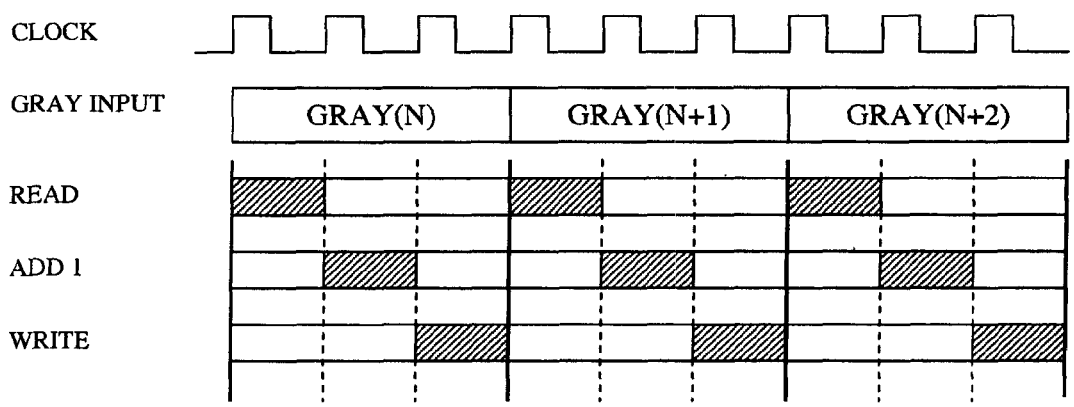
FIG. 12B is a timing diagram of the typical histogram data extraction unit of FIG. 12A.

FIG. 12A is a block diagram of a typical histogram data extraction unit and FIG. 12B is the respective timing diagram of the unit. Referring to FIG. 12A, the histogram extraction circuit receives a digital input luminance signal Y. The obtained histograms are kept in a RAM until it outputs the result. The circuit is responsible for inputting an input digital image signal as an address, increasing the value of data stored at the input address, and obtaining a histogram indicating the number of samples distributed to each gray level by repeating the address input step and the data value increasing step for the entire image.

Referring to FIG. 12B, the conventional histogram extraction circuit needs at least three clock cycles to handle one input gray pixel. Therefore, the READ/ADD/WRITE operations cannot be performed in parallel due to the possible data dependencies of the neighboring input data, i.e., the neighboring gray level input can be the same value. However, the histogram architecture of the present invention removes the dependencies between consecutive gray data inputs using a de-coupler unit. Consequently, the READ/ADD/WRITE operations are pipelined in parallel, for example, in a dual port memory, as shown in FIG. 14A.

Figure 13A:
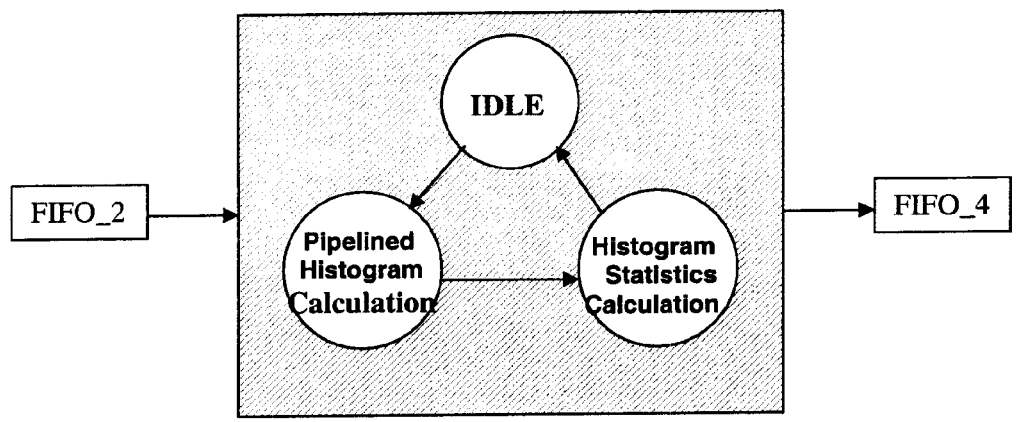
FIGS. 13A-13B are exemplary block diagrams for a histogram data extraction unit, according to one embodiment of the present invention.
Figure 13B:
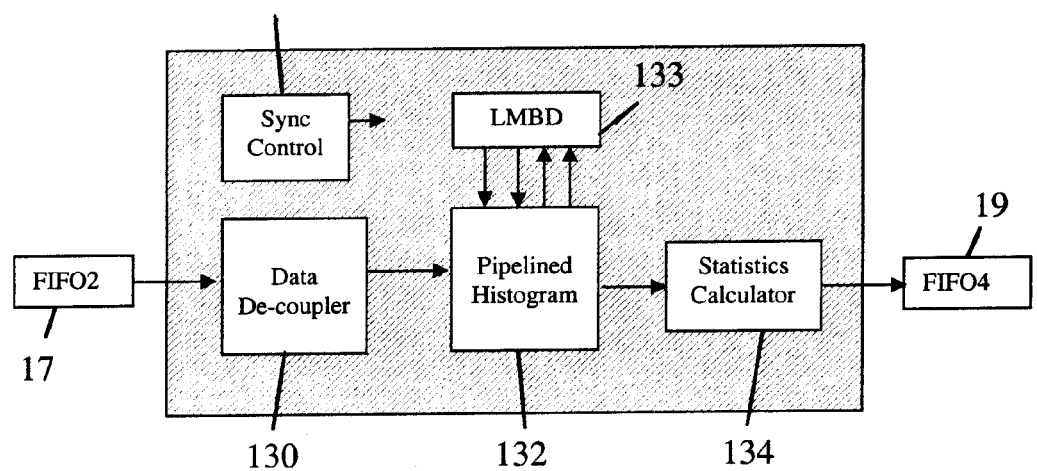

In one embodiment of the present invention, histogram module receives input gray image from FIFO2, calculates a histogram of input data, calculates statistic data based on the histogram and then, outputs the statistic data to FIFO4. Referring to FIG. 13A, this module includes 3 states, IDLE state, Pipelined Histogram Calculation state, and Histogram Statistics Calculation state. After reset, the module is in IDLE state. FIG. 13B shows an exemplary block diagram of a histogram module. A De-coupler module 130 receives a digital encoded luminance signal from FIFO2 17 and outputs two signals to the pipelined histogram 132. The De-coupler module 130 and the pipelined histogram 132 are explained in more detail below. LMBD (left most bit detection) 133 is used to obtain the maximum and minimum gray levels, that is the first and last non-zero value in the histogram array. Statistics Calculator 134 calculates the mean gray value and other statistics based on the histogram. Sync. Control unit 131 controls the synchronization between the different modules.

When there is data input from FIFO2, the module transits to Pipelined Histogram Calculation state. In this state, a pipelined histogram module 132 calculates the histogram based on input gray data from FIFO2 for example, using a six stage pipeline. After all the input data is processed, the histogram of the entire input image is obtained and the module transits to Histogram Statistics Calculation state. In this state, a statistics calculator module 142 calculates the statistic data based on the histogram and outputs the calculated statistics to FIFO4. The module returns to IDLE state after the statistic calculation. Calculating the local histogram of every pixel is a computation-intensive operation. For example, in a typical software implementation of a fingerprint-processing algorithm, ⅓ of total computation time is used for histogram computations.

Figures 14A, 14B:
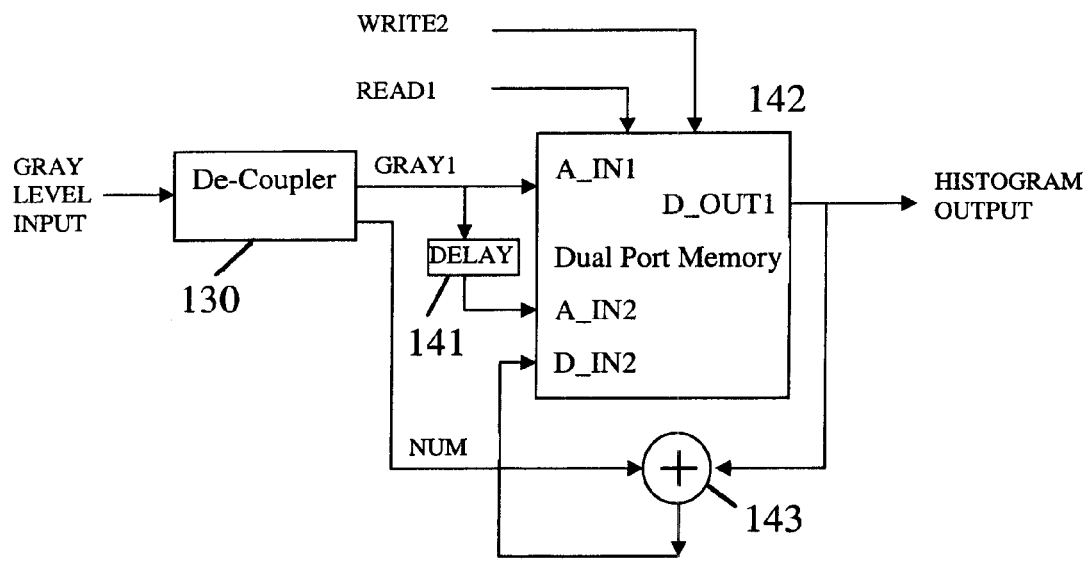
FIG. 14A is an exemplary block diagram of a histogram data extraction unit, according to one embodiment of the present invention.
FIG. 14B is a timing diagram of the histogram data extraction unit of FIG. 14A, according to one embodiment of the present invention.

Referring to FIG. 14A, the De-coupler module 130 receives a digital encoded luminance signal and after three pipeline stages, it outputs two signals to the histogram module. Delay element 141 is used to delay the output from the input by one clock cycle. As shown, the adder 143 has two inputs, one from the dual port memory 142 for the previous (old) count number of the gray level of the current pixel. The other input to the adder is Num that comes from De-coupler module 130. This input indicates the count in De-coupler for the gray level of the current pixel.

For example, if the input sequence to De-coupler is "1 2 3 4 5 . . . ," then the output GRAY1 and NUM sequence is [1,1], [2,1], [3,1], . . . Similarly, if the input sequence is "1 1 1 1 2 2 2 3 4 5 . . . ," the output of De-coupler is [1,4], [2,3], [3,1], [4,1] . . . Additionally, if the input sequence is "1 2 3 1 1 1 2 2 3 4 5 . . . ", the output of De-coupler is [1,4], [2,3], [3,1], [4,1] . . . [x, y] denotes the count of gray level x is y, wherein y will be used later in the adder.

With traditional single port RAMs, the histogram calculations need three non-overlapping clock cycles. That is, one clock cycle for reading out the count of the current gray level, one clock cycle for adding one to the count, and one clock cycle for writing back the updated count value. However, with a dual port RAM and a De-coupler module, the 3 clock cycles can be performed in one clock cycle (a pipeline mode). Reading the count of gray level from port 1 at time T(N), adding the count of gray level at time T(N−1), and writing the updated count of gray level through port 2 at T(N−2) can all be performed in the same clock cycle, because the gray levels from De-coupler module at Time (N), (N−1), (N−2) are different. Therefore, there is no address conflict for the dual port RAM.

FIG. 14B shows an exemplary timing diagram of the histogram extraction unit when MISS flag is '1'. The data input to the De-coupler module 130 at time N is depicted as "N." The shaded areas in the timing diagram illustrate how data N is processed through the different stages of the histogram unit pipeline. Assuming each consecutive data is different, gray level data N is processed in De-coupler module 130 from time N=1 to N=3. Then, at time N=4 to N=6, the data is processed by the READ/SUM/WRITE, which is a three-stage pipeline in the pipelined histogram 132.

Figure 15:
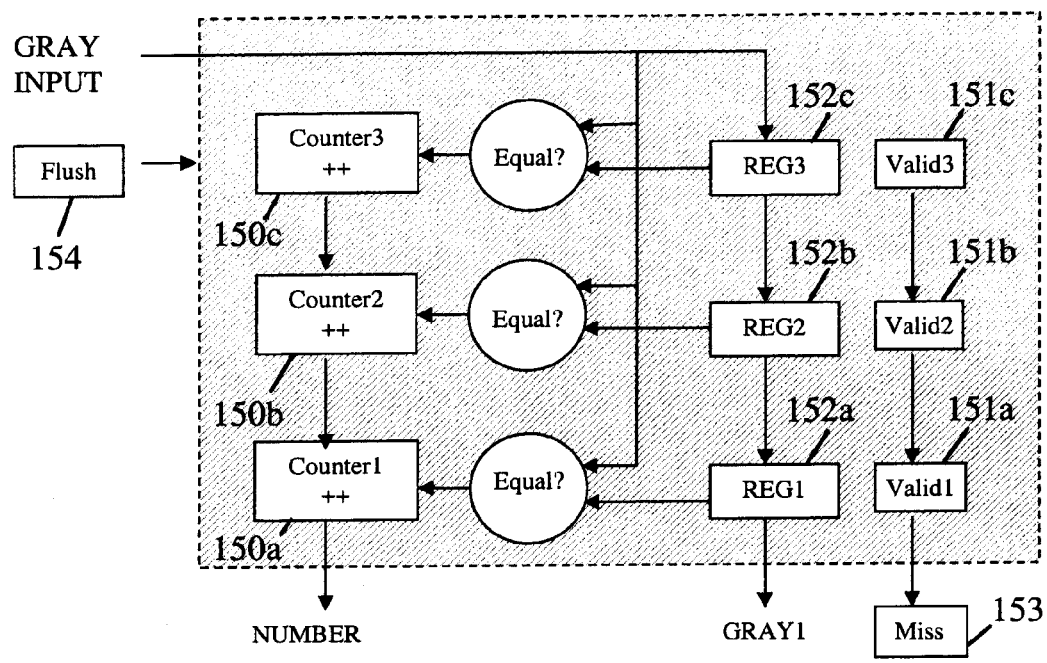
FIG. 15 is a simplified block diagram of a Pipelined decoupler unit, according to one embodiment of the present invention.

FIG. 15 is a simplified block diagram of a Pipelined De-coupler unit 130, according to one embodiment of the present invention. The input of this unit can be any gray level sequence. In this embodiment, the unit has three different stages, pipeline filling stage, normal working stage, and pipeline flushing stage.

After Reset, the pipeline is Empty. The contents of all of the three counters (150a, 150b, and 150c) are 0, all the three VALID flags (151a, 151b, and 151c) are '0', meaning the contents of the three registers (REG1 152a, REG2 152b, and REG3 152c) are invalid. In this case, when the first gray level input arrives, it is stored in REG3 152c, VALID3 flag 151c becomes '1', COUNTER3 150c becomes 1, and other counters and registers remain unchanged. When the second gray level input arrives, it is compared with the content of REG3 152c. If the data are the same, then COUNTER3 150c is incremented, else, the content of REG3 is shifted to REG2 152b, the content of VALID3 is shifted to VALID2 flag 151b, and the content of COUNTER3 is shifted to COUNTER2 150b. Then, REG3 is set with the new input gray level, VALID3 flag is set to '1', and COUNTER3 is set to 1.

When the third input arrives, it is compared with REG3, if same, COUNTER3 is incremented and compared with REG2 if VALID2 flag is '1'. If same, then COUNTER2 is incremented, else, the contents of COUNTER2, REG2, and VALID2 are shifted to COUNTER1 150a, REG1 152a, and VALID1 flag 151a, respectively. Also, the contents of COUNTER3, REG3, and VALID3 are shifted to COUNTER2, REG2, and VALID2, REG3 is set to the new gray level, VALID3 is set to '1', and COUNTER3 is set to 1. At this time, the pipeline is filled, i.e., all the three VALID flags are '1', meaning that all the contents of the three REGs are valid and different from each other. From now on, the pipeline is in normal working stage.

In operation, when any new input comes in, it should be compared with all the three REGs 152a, 152b, and 152c. If the input is equal to any one of the REGs, the corresponding COUNTER is incremented by 1. If the input data is different than the data in all of the three registers, a MISS flag 153 is set to inform pipelined histogram unit to process the current valid GRAY1, NUMBER pair. That is, shifting COUNTER1, REG1, VALID1 to Histogram Extraction unit. Additionally, COUNTER1, REG1, VALID1 are updated with contents of CONTER2, REG2, VALID2, COUNTER2, REG2, VALID2 are updated with contents of COUNTER3, REG3, VALID3, REG3 is set to new input gray level, COUNTER3 is set to 1, and VALID3 is set to >1=. The process is then repeated for every pixel in the image.

When processing of the input image completes, De-coupler unit 130 is informed to clear its pipeline by shifting all its valid contents out sequentially. This is done by setting a FLUSH input signal 154. In this case, three clocks are needed. In the first clock cycle, MISS flag 153 is set, and the contents of COUNTER1 is shifted to REG1 if VALID1 is '1'. In the second clock cycle, MISS flag is set, and the contents of COUNTER2 is shifted to REG2 if VALID2 is '1'. In the third clock cycle, MISS flag is set, and the contents of COUNTER is shifted to REG3. Then, all the VALID flags are set to '0'.

As an illustration, given an input sequence [1 2 2 3 3 3 4 5 4 6 7 7 8 9 0 . . . ], the output from the De-coupler would be Gray1=[1 2 3 4 5 6 7 . . . ], and Num=[1 2 3 2 1 1 2 . . . ]

Figure 16:
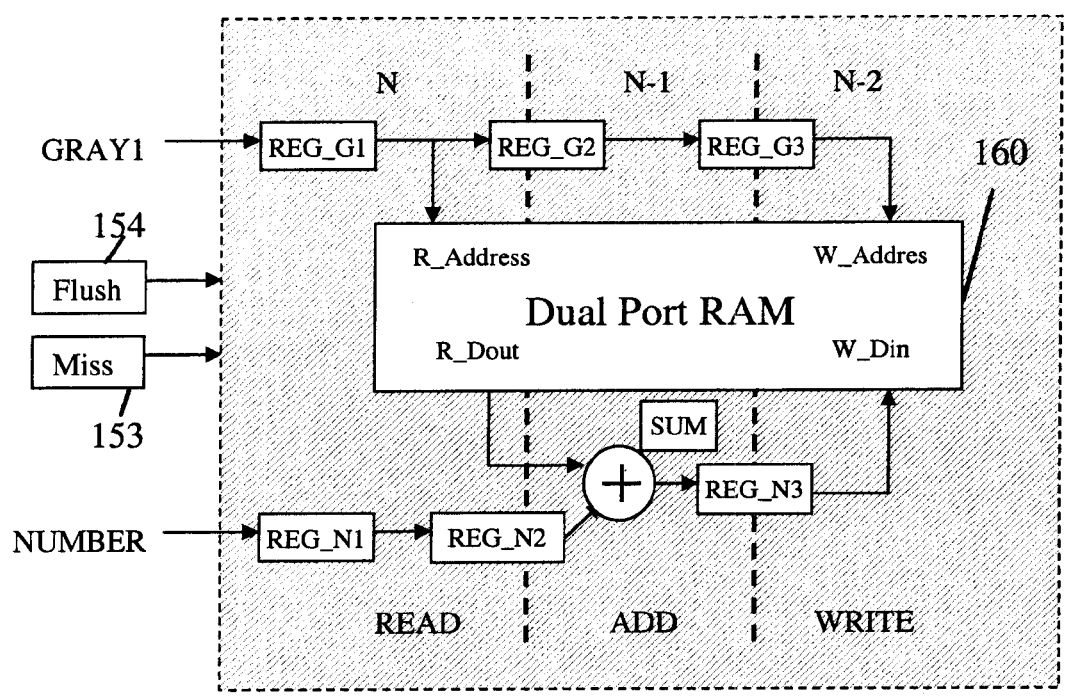
FIG. 16 is a simplified block diagram of a pipelined histogram extraction unit, according to one embodiment of the present invention.

FIG. 16 is a simplified block diagram of a pipelined histogram extraction unit (pipelined histogram 132 in FIG. 13B), according to one embodiment of the present invention. This unit receives input data from De-coupler unit and processes input data when MISS flag 153 is '1'. Also, the unit flushes the pipeline only when FLASH signal is '1' and MISS flag is '0'. In one embodiment, the core of this module is a synchronous dual Port RAM 160. For simplicity, suppose the data read is one clock later than address and READ signal, while data to be written is in the same clock cycle as write-in address.

The pipeline filling and flush stages share some similarities with the De-coupler unit. Each time MISS flag is set, the content of REG_N3 is written into memory with address specified by REG_G3, while the contents of REG_G3 and REG_N3 are updated with the contents of REG_G2 and SUM, the contents of REG_G2 and REG_N2 are updated with the contents of REG_G1, REG_N1, and the contents of REG_G1 and REG_N1 are updated with the contents of GRAY1 and NUMBER. In theory, REG_GI and REG_N1 are not necessary for the operation of the unit, however, they are mentioned here for clarity reasons.

Figure 17:
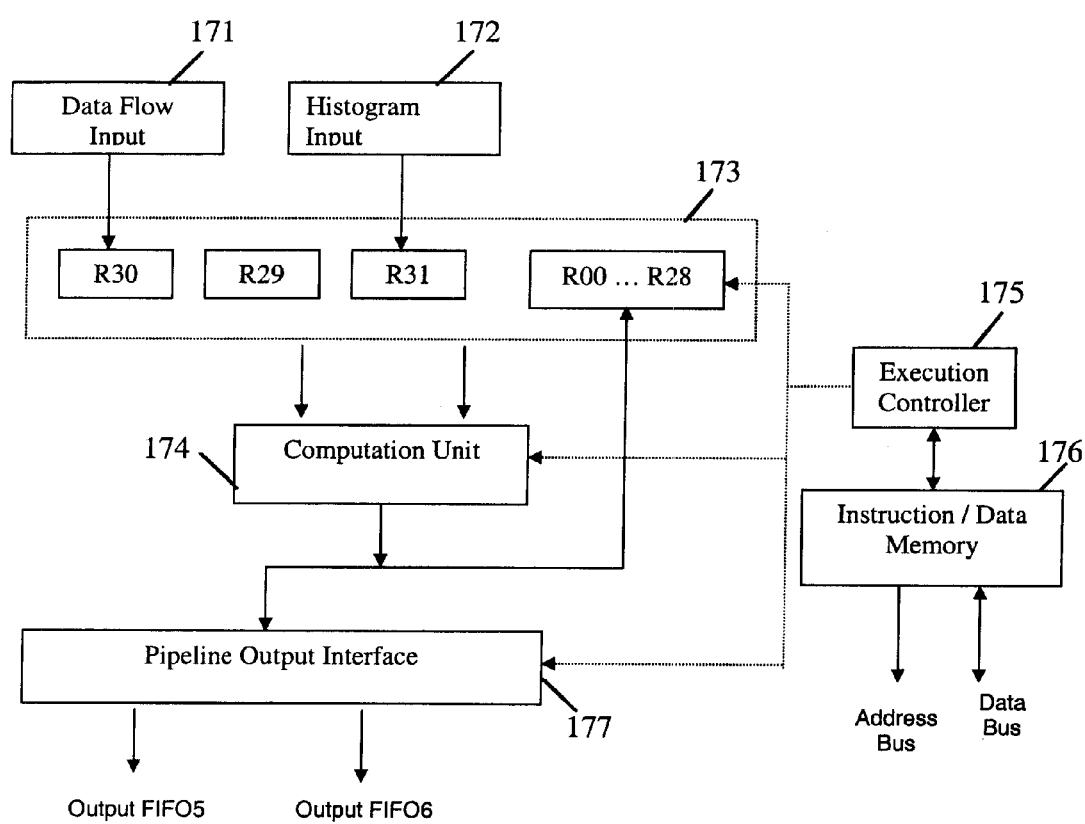
FIG. 17 is a simplified block diagram of a PIPE, according to one embodiment of the present invention.

The Data Processing module (PIPE) is preferably a general purpose microprocessor with data flow driven instructions that can efficiently process image data. FIG. 17 is a simplified block diagram of a PIPE, according to one embodiment of the present invention. In one embodiment, there are two data flow inputs. First input 171 is from the data flow organizer module (FIFO3) and the second input 172 is from the histogram module (FIFO4). The data processing module can generate two data flow outputs by a pipeline output interface 177, Output FIFO5 and Output FIFO6. The PIPE reads the data flow inputs by reference to register R30 and R31, and writes the data in internal data bus to output FIFO5, output FIFO6 or both.

Computation unit 174 performs arithmetic and logic calculations specified by instructions. In one embodiment, all input data are taken from registers defined in the instruction. The result of the calculation can be stored in a register specified by the instruction or can be written into one or both result FIFOs through the pipeline output interface 177 controlled by the instruction. The computation unit also has a pipelined division unit for executing division instructions every clock cycle. Execution controller 175 controls the instruction flow executed by the computation unit 174. Execution controller also performs memory access operation if a memory reference instruction is executed. If the instruction executed needs to access the data stream input port (or ports) and the data in the port (or ports) is not available, the execution of the instruction is stopped until the required data are available. If the current instruction needs to write the result into the data stream output port(s) and the port(s) is unavailable due to the FIFO full condition, the next instruction will be stopped from execution until the write operation is completed. For example, there is a data available flag associated with R30. Whenever an instruction references R30 and data is not available in R30, the execution is stopped until data becomes available from the FIFO3. There is a data available flag associated with R31, whenever an instruction references R31 and data is not available in R31, the execution is stopped until data becomes available from the FIFO4.

Instruction/data memory is used to store instructions/data and is accessed and managed by the execution controller unit. In one embodiment, register bank 173 includes 32 registers. The 29 registers R01 to R29 are general purpose registers. However, register R31 is a special purpose register used to access the data stream from the data flow organizer. When an instruction executed denotes R30 as a source register, R30 uses the data from the data flow organizer as an input. The content of this register can be updated to contain the next data from the data flow organizer if the instruction executed contains a R30 update option. Register R31 is a special register used to access the data stream from the histogram unit. When an instruction executed designates R31 as a source register, R31 uses the data from the histogram unit as an input. The content of this register can be updated to reflect the next data from the histogram unit, if the instruction executed contains a R31 update option.

In one embodiment, the data processing instructions include four data flow management options:

1) FIFO3 data update: The data in FIFO3 is moved to R30 and R30 data available flag is set to 'true' if data is available in FIFO3, otherwise, R30 data available flag is set to 'false'.

2) FIFO4 data update: The data in histogram FIFO is moved to R31, and R31 data available flag is set to 'true' if data is available in Histogram FIFO otherwise, R31 data available flag is set to 'false'.

3) Output FIFO5: The result of computation of current instruction is written to output FIFO, FIFO5. If FIFO5 is full, the instruction execution is stopped until the write operation is completed.

4) Output FIFO6: The computation result of current instruction is written to output FIFO6. If the output FIFO6 is full, the instruction execution is stopped until the write operation is completed.

Table 1 depicts some examples of assembly code for the data processing module.

TABLE 1

Examplary assembly code

```
.start .export Mean:
        MV      R00 Line                    ; line size
        MV      R01 Column                  ; column size
        MVCNTA R00                          ; set line loop counter
Loop:   MV      R3 R30          df ca       ; initialze sum of the first column,
                                              update R30
                                            ; and decrease loop counter A
        ADD     R3 R3 R30       df          ; R3+R30 -> R3, update R30
        ADD     R3 R3 R30       df          ; R3+R30 -> R3, update R30
        MV      R4 R30          df          ; initialize sum of second
                                              column, update R30
        ADD     R4 R4 R30       df          ; R4+R30 -> R4, update R30
        ADD     R4 R4 R30       df          ; R4+R30 -> R4, update R30
        MV      R5 R30          df          ; initialize sum of third column,
                                              update R30
        ADD     R5 R5 R30       df          ; R5+R30 -> R5, update R30
        ADD     R5 R5 R30       df          ; R5+R30 -> R5, update R30
        ADD     R6 R3 R4                    ; add first 2 columns
        ADD     R6 R6 R5                    ; add third column to the sum
        DIV     R6 9                        ; sum/9
        MVCNTB R1                           ; set column loop counter
Loop 1: MV      R7 R30          df cb       ; initialize sum of new column,
                                              update R30 and
                                            ; decrease loop counter B
        ADD     R7 R7 R30       df          ; R7+R30 -> R7, update R30
        ADD     R7 R7 R30       df          ; R7+R30 -> R7, update R30
        ADD     R6 R6 R7                    ; add new column to the sum
        SUB     R6 R6 R3                    ; subtract the old column
                                              sum in R3
        DIV     R6 9                        ; sum/9
        MV      R3 R4                       ; update first column sum
        MV      R4 R5                       ; update second column sum
        MV      R5 R7                       ; update third column sum
        JMPBNZ Loop1 EXEC                   ; if loop counter B not 0, jump
                                              to Loop1; always execute the next
                                              instruction
        WRT1    R29             nd          ; write division result to FIFO5,
                                              update R29
```

TABLE 1-continued

Examplary assembly code

```
        JMPBNZ Loop exec           ; if loop counter A not 0, jump
                                     to Loop; always execute the next
                                     instruction
        WRT1    R29          nd    ; write division result to FIFO5,
                                     update R29
        HALT                       ;    halt the pipeline execution
.end
```

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention for a hardware architecture designed to efficiently process two dimensional digital images, for example fingerprint images, facial images, eye iris or retina images, as well as other data streams, as defined by the appended claims.

What is claimed is:

1. A system for organizing data flow for two-dimensional image processing comprising:
    an address engine for generating addresses for reading image data from and writing image data to an external memory, the address engine comprising:
        a DMA unit for interfacing with the external memory, and
        a data flow organizer module for re-ordering the image data read from the external memory and generating data flows for the image data to be processed; and
    a data processing module for processing the image data read from the external memory, wherein
    the DMA unit comprises:
        a plurality of first read address generation units for generating read addresses for reading the image data from the external memory, and
        at least one first write address generation units for generating write addresses for writing the image data to the external memory, and wherein the data flow organizer module comprises:
        a cache memory divided into a plurality of virtual memories,
        a lookup table for storing function data,
        a plurality of second read address generation units for generating read addresses for reading data from the cache memory, each of the second read address generation units corresponding to a respective one of the plurality of virtual memories,
        a plurality of second write address generation units for generating write addresses for writing data to the cache memory, each of the second write address generation units corresponding to a respective one of the plurality of virtual memories,
        a control and synchronization circuit for ensuring that the data is in the cache memory and push the data to the data processing module, when need, and
        a plurality of pointer registers for ensuring that reading each memory cell in the cache memory is performed later than writing to said memory cell.

2. The system of claim 1, further comprising a plurality of FIFOs to regulate data transfers.

3. The system of claim 1, wherein the data processing module is a RISC machine.

4. The system of claim 1, wherein the data processing module includes mode register for controlling the type of data processing to be performed on the image data.

5. The system of claim 1, wherein the plurality of first read address generation units and first write address generation units perform block scanning.

6. The system of claim 1, wherein addresses for function data stored in the lookup table is an angle of one or more image attributes and values stored in the addresses are SIN or Tan of respective addresses.

7. The system of claim 1, wherein each of the plurality of virtual memories corresponds to a respective area and each area includes a first programmable parameter to determine an offset of each area, and a second and a third programmable parameter to determine a size of each area.

8. The system of claim 7, wherein each of the respective areas stores a different type of data, which has a logical relationship in every corresponding pixel of the image.

9. The system of claim 8, wherein a first area stores red components of a color image, a second area stores green components of a color image, and a third area stores blue components of a color image.

10. The system of claim 1, wherein the cache memory is a dual-port RAM.

11. The system of claim 1, wherein the cache memory is a single-port RAM.

12. The system of claim 1, further comprising a plurality of control registers for controlling a scan mode of the image.

13. The system of claim 1, wherein the data processing module comprises:
    a plurality of registers for controlling input data flow and output data flow;
    a computation unit coupled to some of the a plurality of registers for performing arithmetic and logic calculations
    an instruction/data memory coupled to the computation unit for storing instructions and data;
    an execution controller for controlling instruction flow and accessing the instruction/data memory; and
    a pipeline output interface for controlling flow of the output data.

14. The system of claim 1, wherein the image data comprises one of the group consisting of fingerprint image data, facial image data, eye iris image data, and retina image data.

* * * * *

UNITED STATES PATENT AND TRADEMARK OFFICE
CERTIFICATE OF CORRECTION

PATENT NO. : 8,254,728 B2  
APPLICATION NO. : 12/500554  
DATED : August 28, 2012  
INVENTOR(S) : Ming Hsieh Page 1 of 2

It is certified that error appears in the above-identified patent and that said Letters Patent is hereby corrected as shown below:

Title Page:

Column 2 (Other Publications)

Line 17, delete "Ummunoassay" and insert -- Immunoassay --, therefor.

In the Drawings:

Sheet 2 of 19 (FIG 2)
Line 2 before "(B)" delete "(A" and insert -- (A) --, therefor.

In the Specifications:

Column 11

Line 67 delete "150a ," and insert -- 150a, --, therefor.

Column 12

Line 31, delete "COUNTER" and insert -- COUNTER3 --, therefor.

Column 12

Line 53 delete "REG_GI" and insert -- REG_G1 --, therefor.

Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,254,728 B2

Column 14

Line 2 delete "Examplary" and insert -- Exemplary --, therefor.

Column 14 (Table 1)

Line 7 delete "initialze" and insert -- initialize --, therefor.

Column 14

Line 24 delete "Loop 1:" and insert -- Loop1: --, therefor.

Column 15 (Table I – continued)

Line 2 delete "JMPBNZ" and insert -- JMPANZ --, therefor.

In the Claims:

Column 16

Line 48 in Claim 13, before "plurality" delete "a".